US011927900B2

(12) United States Patent
Ogiso et al.

(10) Patent No.: US 11,927,900 B2
(45) Date of Patent: Mar. 12, 2024

(54) FIXING DEVICE AND IMAGE FORMING APPARATUS INCORPORATING SAME

(71) Applicants: Toshio Ogiso, Tokyo (JP); Tamotsu Ikeda, Tokyo (JP)

(72) Inventors: Toshio Ogiso, Tokyo (JP); Tamotsu Ikeda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/147,454

(22) Filed: Dec. 28, 2022

(65) Prior Publication Data

US 2023/0251592 A1 Aug. 10, 2023

(30) Foreign Application Priority Data

Jan. 26, 2022 (JP) ................................ 2022-010149

(51) Int. Cl.
*G03G 15/20* (2006.01)

(52) U.S. Cl.
CPC ..... *G03G 15/2028* (2013.01); *G03G 15/2053* (2013.01)

(58) Field of Classification Search
CPC ........................... G03G 1/2028; G03G 1/2053
USPC ......................... 399/107, 110, 122, 320, 328
See application file for complete search history.

(56) References Cited

U.S. PATENT DOCUMENTS

| | | | | |
|---|---|---|---|---|
| 9,811,033 | B2 * | 11/2017 | Miki | G03G 15/2028 |
| 10,054,885 | B2 * | 8/2018 | Okamoto | G03G 15/206 |
| 10,234,798 | B2 * | 3/2019 | Watanabe | G03G 15/20 |
| 2013/0004222 | A1 | 1/2013 | Sakaya et al. | |

FOREIGN PATENT DOCUMENTS

| | | | |
|---|---|---|---|
| JP | 2013-015551 | | 1/2013 |
| JP | 2019015931 | * | 1/2019 |
| JP | 2019-144410 | | 8/2019 |

OTHER PUBLICATIONS

U.S. Appl. No. 17/825,471, filed May 26, 2022, Seiji Saitoh, et al.

* cited by examiner

*Primary Examiner* — Hoan H Tran
(74) *Attorney, Agent, or Firm* — Harness, Dickey & Pierce, P.L.C.

(57) ABSTRACT

A fixing device includes a fixing rotator, a pressure rotator, a pressure plate, a pressing force, an entrance guide, an exit guide, and a transmission. The pressure rotator presses the fixing rotator to form a nip between the fixing rotator and the pressure rotator. The pressure plate rotates about a fulcrum to press the pressure rotator. The pressing force adjuster adjusts a pressing force of the pressure rotator. The entrance guide guides a recording medium entering the nip. The exit guide guides the recording medium ejected from the nip. The transmission transmits a displacement of the pressure plate to the entrance guide and the exit guide.

14 Claims, 15 Drawing Sheets

FIG. 37
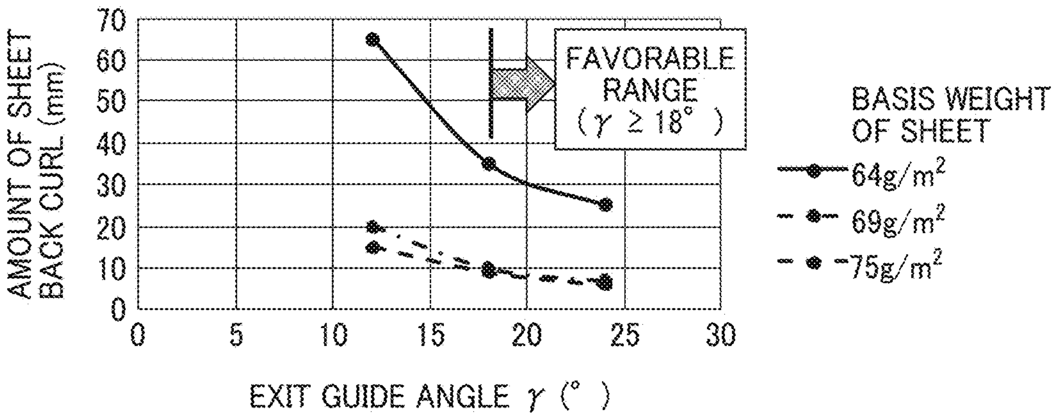
FIG. 38A
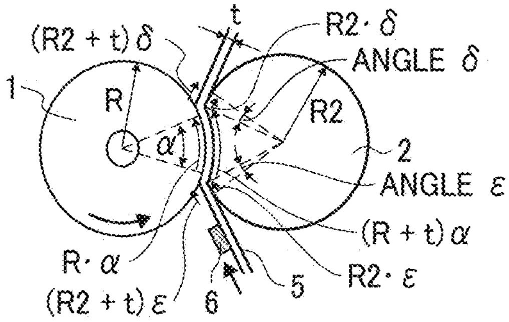
FIG. 38B
| | A | B | |
|---|---|---|---|
| | PRINTED SURFACE OF ENVELOPE | NON-PRINTED SURFACE OF ENVELOPE | A−B |
| SPACE AROUND ENTRANCE GUIDE | $(R2 + t)\varepsilon$ | $R2 \cdot \varepsilon$ | $t \cdot \varepsilon$ |
| NIP | $R \cdot \alpha$ | $(R + t)\alpha$ | $-t \cdot \alpha$ |
| SPACE AROUND EXIT GUIDE | $(R2 + t)\delta$ | $R2 \cdot \delta$ | $t \cdot \delta$ |
| | |
|---|---|
| TOTAL DIFFERENCE OF (A − B) | $t(\varepsilon + \delta - \alpha)$ |

FIXING DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2022-010149, filed on Jan. 26, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

One type of image forming apparatus includes a fixing device to fix an image onto a sheet. Since the fixing device heats, presses, and conveys the sheet, a crease may be generated in the sheet while the sheet passes through the fixing device.

SUMMARY

This specification describes an improved fixing device that includes a fixing rotator, a pressure rotator, a pressure plate, a pressing force adjuster, an entrance guide, an exit guide, and a transmission. The pressure rotator presses the fixing rotator to form a nip between the fixing rotator and the pressure rotator. The pressure plate rotates about a fulcrum to press the pressure rotator. The pressing force adjuster adjusts a pressing force of the pressure rotator. The entrance guide guides a recording medium entering the nip. The exit guide guides the recording medium ejected from the nip. The transmission transmits a displacement of the pressure plate to the entrance guide and the exit guide.

This specification also describes an image forming apparatus including the fixing device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 37 is a graph illustrating a relationship between the exit guide angle and an amount of the sheet back curl of the sheet of plain paper printed on the one side;

FIG. 38A is a diagram illustrating parameters relating an envelope crease and conveyance amounts of the printed surface and the non-printed surface of the envelope in a space around the entrance guide, the nip, and a space around the exit guide when the entrance guide and the exit guide are set so as to reduce the envelope crease; and FIG. 38B is a table illustrating the conveyance amounts of the printed surface and the non-printed surface of the envelope in the space around the entrance guide, the nip, and the space around the exit guide and differences between the conveyance amounts of the printed surface and the conveyance amounts of the non-printed surface when the entrance guide and the exit guide are set so as to reduce the envelope crease.

Figure 1:
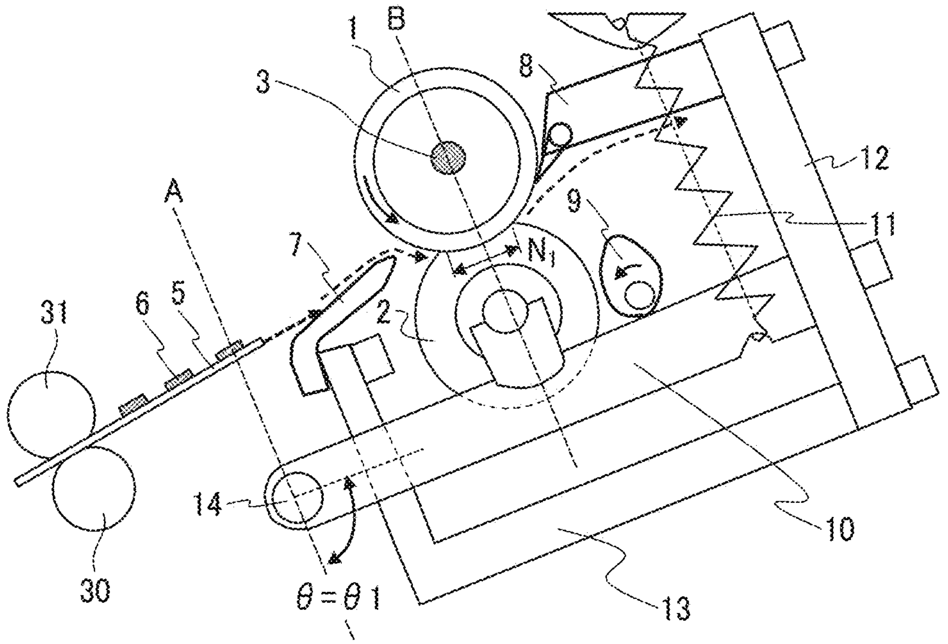
FIG. 1 is a diagram illustrating a configuration of a fixing device increasing pressing force according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating the following embodiments, the same reference numbers are allocated to elements having the same function or shape and redundant descriptions thereof are omitted below.

An electrophotographic image forming apparatus includes a fixing device that heats toner of a toner image to fix the toner image onto a sheet. The fixing device includes an entrance guide to guide the sheet being conveyed from a transfer device upstream from the fixing device and entering the fixing device. In addition, the fixing device includes an exit guide to guide the sheet ejected from the fixing device. The sheet guided by the exit guide is conveyed to a sheet ejection device downstream from the fixing device. The fixing device includes a fixing rotator such as a fixing roller and a pressure rotator such as a pressure roller. The pressure rotator presses the fixing rotator to form a fixing nip. Hereinafter, the fixing nip is simply referred to as a nip.

The fixing device heats and presses the toner on the sheet in the nip to fix the toner onto the sheet. Conveying the sheet in the nip may put a crease in the sheet. When the image forming apparatus forms images on both sides of the sheet, respectively, that is, in a double-sided printing mode, an end of the sheet may curl after the image is formed on one side of the sheet. When the image forming apparatus forms the image on the other side of the sheet, the sheet having the curl at the end of the sheet enters the nip. In this case, positions at a leading edge of the sheet in an axial direction of the fixing rotator or the pressure rotator enter the nip at different timings, which causes the crease in the sheet. Since an envelope is made by folding and layering a sheet, a difference between velocities of the front side and the back side of the envelope occurs when the envelope is nipped and conveyed by the fixing rotator and the pressure rotator, which causes the crease in the envelope. Hereinafter, the crease in the envelope is referred to as an envelope crease. In particular, a thin envelope having a basis weight of 80 $g/m^2$ or less is likely to generate the envelope crease. To prevent the occurrence of the crease, an angle of the sheet entering the nip and an angle of the sheet ejected from the nip are adjusted.

With reference to FIGS. 28 to 38, the following describes how the crease occurs and a relationship among the occurrence of the crease and angles of the entrance guide and the exit guide in the fixing device. The entrance guide is near an entrance of the nip, and the exit guide is near an exit of the nip. The following describes the occurrence of the crease in the envelope and the occurrence of the crease in a sheet of plain paper. The sheet of plain paper and the envelope are examples of recording media on which the image forming apparatus forms the toner image.

Firstly, the following describes how the nip having a curvature generates the envelope crease.

The fixing device includes a pair of rotators such as the fixing rotator and the pressure rotator. The rotators heat and press the envelope bearing an unfixed toner image under a predetermined pressure condition and a predetermined temperature condition to fix the toner image onto the envelope passing through the nip. Under the predetermined pressure condition, one of the pair of the rotators may have a convex shape in the nip, and the other one of the pair of the rotators may have a concave shape in the nip. For example, the pressure roller softer than the fixing roller elastically deforms to form the nip. In the envelope formed by layering two sheets, a curvature radius between a printed surface of the envelope and a center of the rotator having the convex shape is different from a curvature radius between a non-printed surface of the envelope and the center of the rotator having the convex shape. As a result, a velocity of a center portion of a surface of the envelope in the axial direction of the rotator on the rotator having the concave shape is faster than a velocity of an end of the surface of the envelope in the axial direction on the rotator having the concave shape. The difference in the velocities is likely to cause the envelope crease. The above is described below in detail with reference to FIGS. 28, 29A, and 29B.

Figure 28:
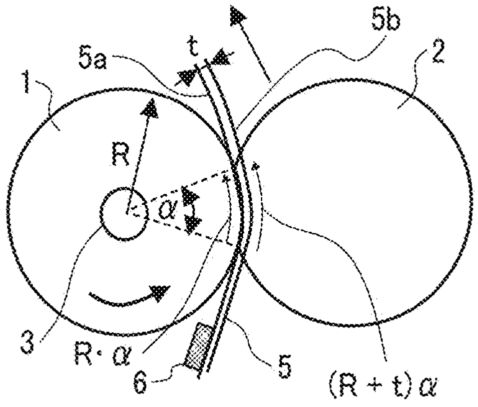
FIG. 28 is a diagram to illustrate a difference between a conveyance amount of the front side of an envelope and a conveyance amount of the back side of the envelope during printing an image on the envelope.

FIG. 28 is a diagram to illustrate a difference between a conveyance amount of the front side of the envelope and a conveyance amount of the back side of the envelope during printing a toner image on the envelope. FIG. 28 illustrates an example of the fixing device including rollers. The fixing device includes a fixing roller 1 incorporating a heater 3 and a pressure roller 2 pressing the fixing roller 1. The envelope as a sheet 5 has a thickness t and is sent to the nip. The nip has an angle $\alpha$ at the circumference. The surface of the envelope on which a toner image 6 is placed is a printed surface 5*a*, and the surface on which the toner image 6 is not placed is a non-printed surface 5*b*. The conveyance amount (that is also referred to as a "feed amount") of the non-printed surface 5*b* in the nip is $(R+t)\alpha$, which is larger than the conveyance amount $R\cdot\alpha$ of the printed surface 5*a* in the nip by $t\cdot\alpha$.

Figures 29A, 29B:
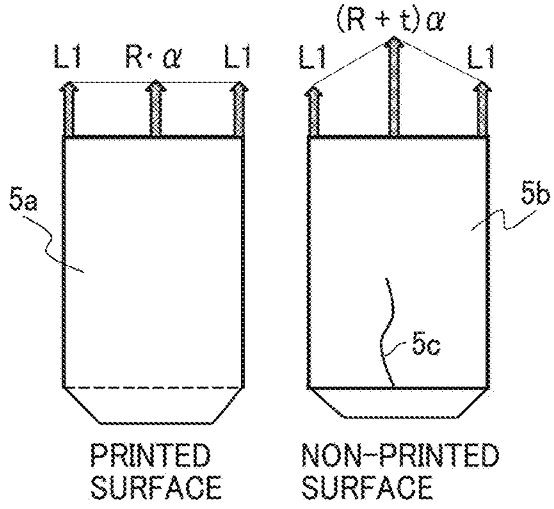
FIG. 29A is a diagram illustrating a conveyance amount distribution of a printed surface of the envelope during printing the image on the envelope.
FIG. 29B is a diagram illustrating a conveyance amount distribution of a non-printed surface of the envelope during printing the image on the envelope.

FIG. 29A is a diagram illustrating a conveyance amount distribution in the printed surface 5*a* of the envelope in the axial direction when the toner image is printed on the envelope. FIG. 29B is a diagram illustrating a conveyance amount in the non-printed surface 5*b* of the envelope in the axial direction when the toner image is printed on the envelope. Since both ends of the envelope in the axial direction are a folded portion in which the sheet is folded or a glued portion in which the ends of the sheet are glued, both ends of the printed surface 5*a* in the axial direction and both ends of the non-printed surface 5*b* in the axial direction are conveyed by the same conveyance amount L1. The conveyance amount L1 is substantially equal to a conveyance amount $R\cdot\alpha$ of the center of the printed surface 5*a* in the axial direction.

However, the center of the non-printed surface 5*b* in the axial direction can freely move from the printed surface 5*a*. The conveyance amount $((R+t)\cdot\alpha)$ of the non-printed surface 5*b* is larger than the conveyance amount $(R\cdot\alpha)$ of the printed surface 5*a*. The conveyance amount distribution of the non-printed surface 5*b* in the axial direction has a larger conveyance amount at the center than both ends in the axial direction, that is, $((R+t)\ \alpha>L1)$. As a result, a trailing end crease 5*c* occurs as illustrated in FIG. 29B. Reducing the angle $\alpha$ in FIG. 28, that is, narrowing the nip width reduces the trailing end crease 5*c*. The fixing device in the embodiments described below includes a pressing force adjuster that reduces a pressing force of the pressure roller pressing the fixing roller to reduce the angle $\alpha$ in FIG. 28 and reduces the crease in the envelope when the image forming apparatus prints the toner image on the envelope.

Secondary, the following describes a condition of the entrance guide to prevent the occurrence of the crease in a large sheet of plain paper in the double-sided printing mode.

When the image forming apparatus prints the toner images on both sides of the large sheet of plain paper, the end of the sheet may curl after the image forming apparatus prints the toner image on one side of the sheet. When the sheet having the curl on the end enters the nip, positions of the leading edge of the sheet in the axial direction do not enter the nip at the same timing. The center of the sheet enters the nip earlier than the end of the sheet having the curl. As a result, the velocity of the center of the sheet in the axial direction is faster than the velocity of the end of the sheet in the axial direction, which causes the crease in the sheet. The following describes the crease with reference to FIGS. 30 and 31.

Figure 30:
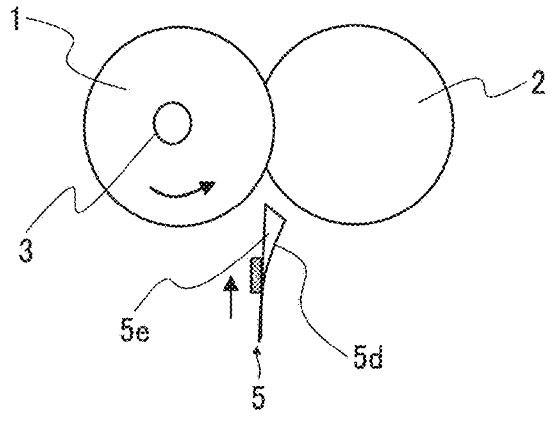
FIG. 30 is a diagram to illustrate an example of a posture of a sheet of plain paper having a curl occurred after single-sided printing and entering the fixing device during double-sided printing.
Figure 31:
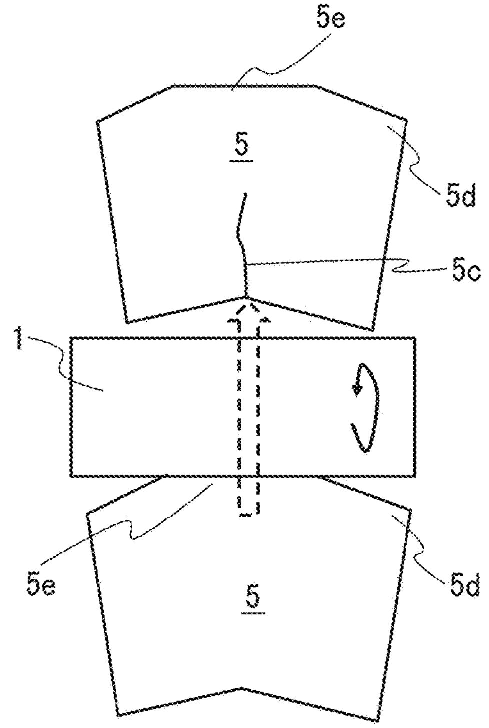
FIG. 31 is a diagram to illustrate an example of the posture of the sheet of plain paper having the curl occurred after the single-sided printing and entering the fixing device during the double-sided printing and an example of a posture of the sheet of plain paper ejected from the fixing device.

FIG. 30 is a diagram to illustrate an example of a posture of the sheet of plain paper (in a vertical section of the fixing device). The sheet has the curl occurred after single-sided printing and enters the fixing device during double-sided printing. FIG. 31 is a diagram to illustrate an example of the posture, in a longitudinal direction of the fixing roller, of the sheet of plain paper having the curl occurred after the single-sided printing and entering the fixing device during the double-sided printing and an example of a posture, in the longitudinal direction of the fixing roller, of the sheet of plain paper ejected from the fixing device. FIG. 30 illustrates the posture of the sheet of plain paper as the sheet 5 with curled ends 5*d* before entering the nip. The end 5*d* of the sheet 5 in the axial direction is farther away from the nip than the center 5*e* of the sheet 5 in the axial direction. FIG. 31 illustrates states before and after the sheet 5 with curled ends enters the nip. When the sheet enters the nip, the center 5*e* of the sheet 5 enters the nip earlier than the end 5*d*, and the sheet 5 is conveyed as it is and heated and pressed at the nip. As a result, the crease 5*c* occurs in the sheet 5.

Figure 32:
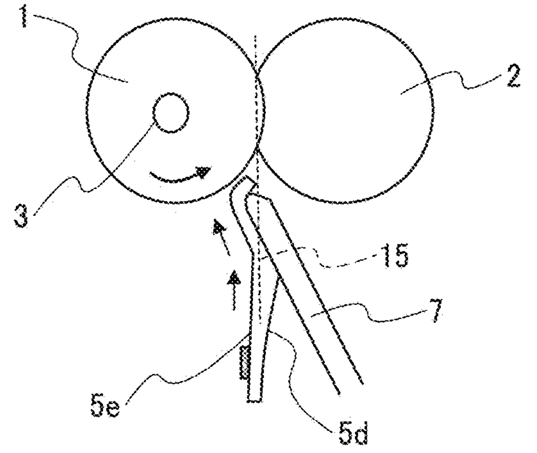
FIG. 32 is a diagram illustrating an example of the fixing device including the entrance guide to reduce a crease in the sheet of plain paper.

In order to avoid the occurrence of the crease, the entrance guide guides the sheet. FIG. 32 is a diagram illustrating an example of the fixing device including the entrance guide to reduce the crease in the sheet of plain paper. The fixing device includes an entrance guide 7 around a portion of the nip into which the sheet enters. As illustrated in FIG. 32, the sheet 5 with the curled end abuts against the entrance guide 7. The entrance guide 7 guides the center of the sheet and the end of the sheet together to the fixing roller 1 and reduces the curl of the end. As a result, positions of the leading edge of the sheet 5 in the axial direction enter the nip at the same timing, and the sheet is conveyed by rotations of the fixing roller 1. Thus, the occurrence of the crease is prevented.

Thirdly, the following describes an angle condition of the entrance guide and an angle condition of the exit guide to favorably reduce the crease in the sheet of plain paper printed on both sides and the envelope crease.

Figure 33:
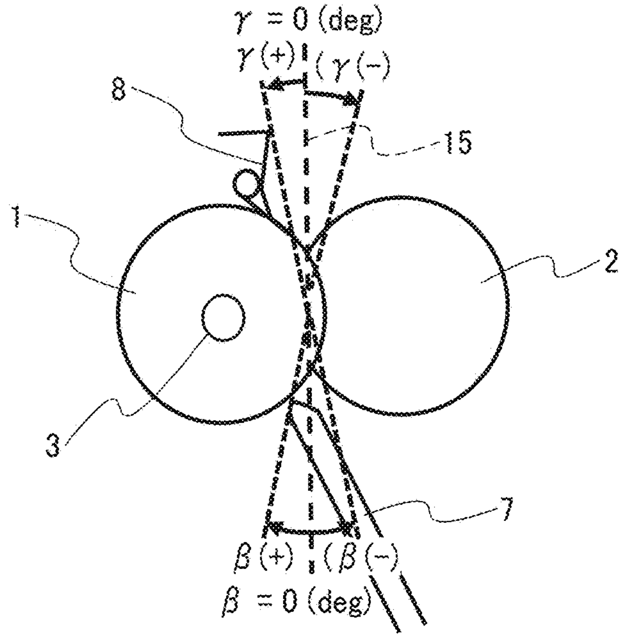
FIG. 33 is a diagram to illustrate the entrance guide angle and the exit guide angle.

With reference to FIG. 33, an entrance guide angle β and an exit guide angle γ are defined. The entrance guide angle β relates to an angle at which the sheet 5 enters the nip. The exit guide angle γ relates to an angle at which the sheet 5 is ejected from the nip. The entrance guide 7 is disposed near the entrance of the nip, and an exit guide 8 is disposed near the exit of the nip. In this specification, the entrance guide is also referred to as an approach guide, the exit guide is also referred to as an ejection guide. In addition, the center of the nip is referred to as a nip center.

As illustrated in FIG. 33, the entrance guide angle β and the exit guide angle γ are defined using the center of the nip and a straight line 15 as a reference line connecting the entrance of the nip and the exit of the nip. The entrance guide angle β is formed by the straight line 15 and a straight line connecting the center of the nip and a tip of the entrance guide 7 (that is, a downstream end of the entrance guide 7 in a sheet conveyance direction). The exit guide angle γ is formed by the straight line 15 and a straight line connecting the center of the nip and a tip of the exit guide 8.

Both angles β and γ are zero (0) on the straight line 15 connecting the entrance of the nip and the exit of the nip. The angles β is expressed by positive values if the straight line connecting the center of the nip and the tip of the entrance guide is inclined to the rotator having the convex shape in the nip. The angles β is expressed by negative values if the straight line connecting the center of the nip and the tip of the entrance guide is inclined to the rotator having the concave shape in the nip. The angles γ is expressed by positive values if the straight line connecting the center of the nip and the tip of the exit guide is inclined to the rotator having the convex shape in the nip. The angles γ is expressed by negative values if the straight line connecting the center of the nip and the tip of the exit guide is inclined to the rotator having the concave shape in the nip. In FIG. 33, the fixing roller 1 is the rotator having the convex shape in the nip, and the pressure roller 2 is the rotator having the concave shape in the nip. The center of the nip is a center position between the entrance of the nip and the exit of the nip on the straight line 15 connecting the entrance of the nip and the exit of the nip, in other words, the center of the nip width.

Figure 34:
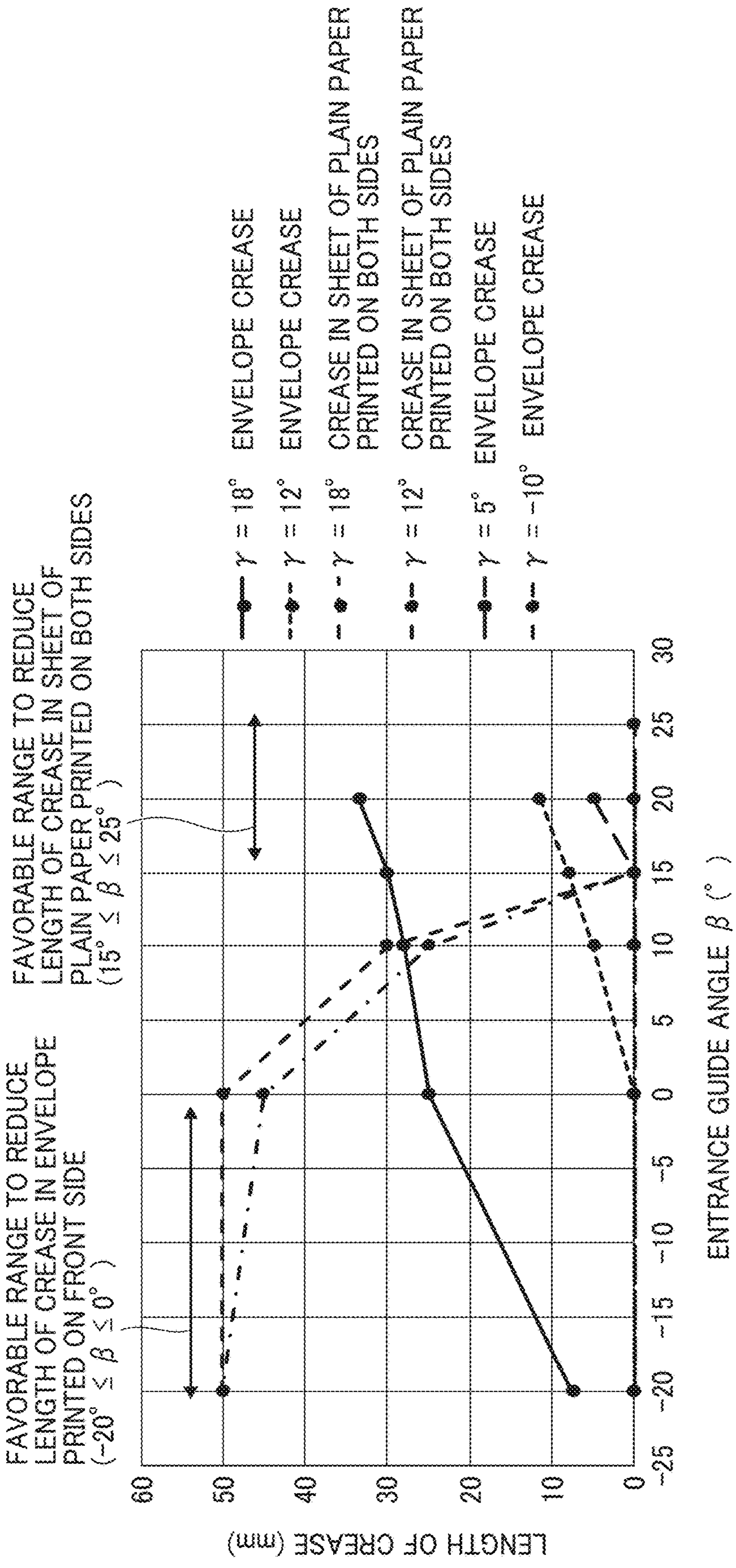
FIG. 34 is a graph illustrating relationships between the entrance guide angle and the envelope crease length in the envelope printed on one side in some different exit guide angles and relationships between the entrance guide angle and the crease length in the sheet of plain paper printed on both sides in some different exit guide angles.

FIG. 34 is a graph illustrating relationships between the entrance guide angle β and a length of the crease in the envelope printed on one side in some different exit guide angles γ and relationships between the entrance guide angle β and a length of the crease in the sheet of plain paper printed on both sides in some different exit guide angles γ. FIG. 34 illustrates results of tests performed under the following test conditions.

Test Conditions:

The width of the nip when the image forming apparatus prints the toner image on the envelope: 2.5 mm The width of the nip when the image forming apparatus prints the toner image on the sheet of plain paper: 7.7 mm A fixing temperature when the image forming apparatus prints the toner image on the envelope: 210° C.

A fixing temperature when the image forming apparatus prints the toner image on the sheet of plain paper: 170° C.

A printing speed when the image forming apparatus prints the toner image on the envelope: 180 mm/s A printing speed when the image forming apparatus prints the toner image on the sheet of plain paper: 252 mm/s The envelope crease was evaluated by an average of envelope crease lengths occurred in envelopes having basis weights of 70 $g/m^2$, 80 $g/m^2$, 90 $g/m^2$, and 100 $g/m^2$.

The crease in the sheet of plain paper was evaluated by the sheet of plain paper having the basis weight of 69 $g/m^2$.

From the results of the tests, the following was found. To reduce the envelope crease, a favorable range of the entrance guide angle β is −20° or more and 0° or less (−20°≤β≤0°). To reduce the crease in the sheet of plain paper printed on both sides, a favorable range of the entrance guide angle β is 15° or more and 25° or less (15°≤β≤25°). The fixing device according to the embodiments described below includes a transmission that sets the entrance guide to the favorable range of the entrance guide angle β to reduce the crease in the sheet of plain paper printed on both sides or the envelope crease. The transmission is coupled to a pressure plate such as a pressure arm 10 that presses a pressure rotator such as the pressure roller 2. When the transmission sets the entrance guide to the favorable range of the entrance guide angle β to reduce the crease in the sheet of plain paper printed on both sides, the pressure plate presses the pressure rotator with a predetermined pressing force to fix the toner image onto the sheet of plain paper. In contrast, when the transmission sets the entrance guide to the favorable range of the entrance guide angle β to reduce the envelope crease, the pressure plate presses the pressure rotator with a predetermined pressing force to fix the toner image onto the envelope that is smaller than the predetermined pressing force to fix the toner image onto the sheet of plain paper.

Figure 35:
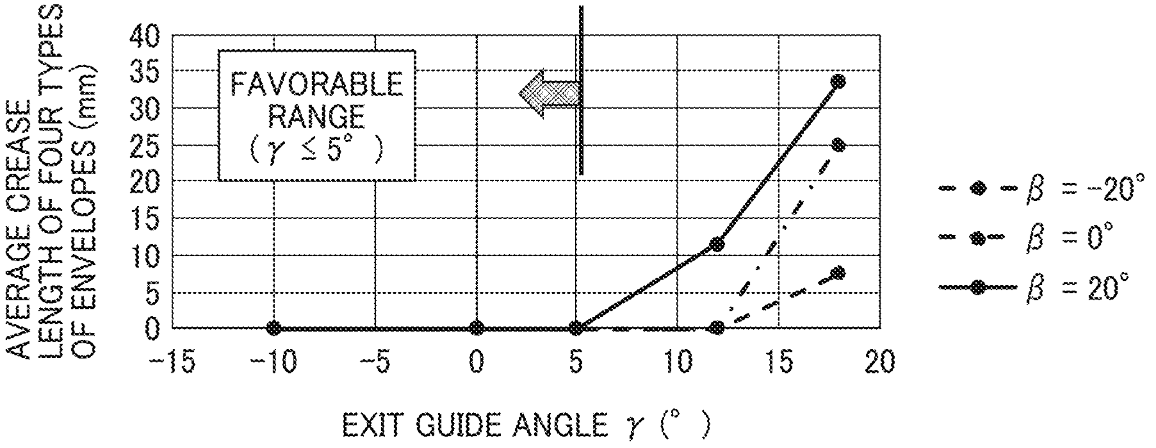
FIG. 35 is a graph illustrating relationships between the exit guide angle and the envelope crease length in some different entrance guide angles.
Figure 36A:
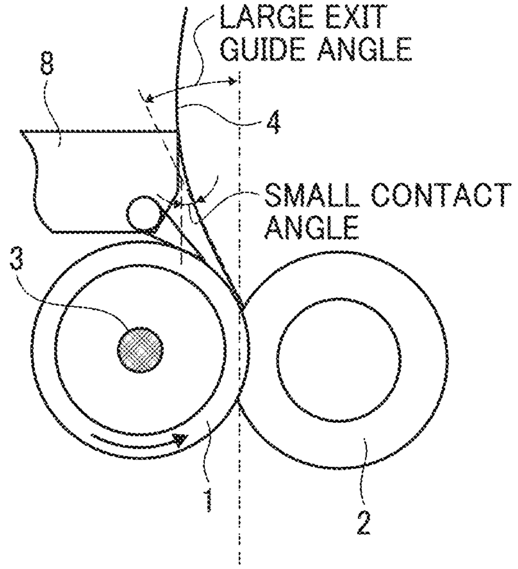
FIGS. 36A and 36B are diagrams illustrating a relationship between a sheet back curl and the exit guide angle.
Figure 36B:
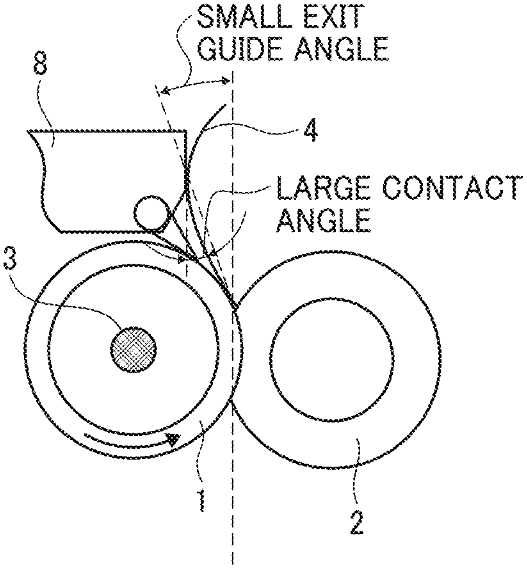

FIG. 35 is a graph illustrating relationships between the exit guide angle and the envelope crease length in some different entrance guide angles. FIGS. 36A and 36B are diagrams illustrating a sheet back curl that is curling of the sheet in a direction from the printed surface of the sheet toward the non-printed surface of the sheet. A certain exit guide angle causes the sheet back curl. In FIG. 36A, the exit guide is set so that the exit guide angle γ is large. In FIG. 36B, the exit guide is set so that the exit guide angle γ is small. As illustrated in FIG. 36A, setting the large exit guide angle γ decreases a contact angle formed by the exit guide 8 and the sheet of plain paper 5 ejected from the nip and increases a curvature radius formed by the sheet of plain paper 5. As a result, the large exit guide angle γ decreases the sheet back curl. In contrast, As illustrated in FIG. 36B, setting the small exit guide angle γ increases the contact angle formed by the exit guide 8 and the sheet of plain paper 5 ejected from the nip and decreases the curvature radius formed by the sheet of plain paper 5. As a result, the small exit guide angle γ increases the sheet back curl. As illustrated in FIG. 35, the larger the exit guide angle γ is, the longer the envelope crease is, which deteriorates print quality. In contrast, as illustrated in FIGS. 36A and 36B, the small exit guide angle γ causes the large back curl of the sheet of plain paper.

FIG. 37 is a graph illustrating a relationship between the exit guide angle γ and an amount of the sheet back curl of the sheet of plain paper printed on the one side. The amount of the sheet back curl was examined by each of sheets of plain paper having basis weights of 64 $g/m^2$, 69 $g/m^2$, and 75 $g/m^2$. As illustrated in FIG. 37, the smaller the exit guide angle γ is, the larger the amount of the sheet back curl of the plain paper is, which deteriorates the print quality. From the results illustrated in FIG. 37, a favorable range of the exit guide angle γ to reduce the sheet back curl of the sheet of plain paper is 18° or more (γ≥18°). In contrast, from the results illustrated in FIG. 35, a favorable range of the exit guide angle γ to reduce the envelope crease is 5° or less (γ≤5°).

FIG. 38A is a diagram illustrating parameters relating the envelope crease when the entrance guide and the exit guide are set so as to reduce the envelope crease. The parameters relate to conveyance amounts of the printed surface of the envelope and conveyance amounts of the non-printed surface of the envelope in a space around the entrance guide, the nip, and a space around the exit guide. FIG. 38B is a table illustrating the conveyance amounts of the printed surface and the non-printed surface of the envelope in the space around the entrance guide, the nip, and the space around the exit guide when the entrance guide and the exit guide are set so as to reduce the envelope crease. In addition, the table includes differences between the conveyance amounts of the printed surface and the conveyance amounts of the non-printed surface in the space around the entrance guide, the nip, and the space around the exit guide.

To reduce the envelope crease, the entrance guide is set so that the entrance guide angle is equal to or smaller than zero (β≤0), and the exit guide is set so that the exit guide angle γ is smaller than zero (γ<0). FIG. 38B illustrates conveyance amounts of the printed surface and the non-printed surface of the envelope made by layering two sheets. In addition, each column under the column indicated by (A-B) in FIG. 38B is the difference between the conveyance amount of the printed surface and the conveyance amount of the non-printed surface in the envelope. While the envelope passes through the nip, the difference between the conveyance amount of the printed surface and the conveyance amount of the non-printed surface is −t·α, which causes the crease. However, the envelope winds around the pressure roller 2 by a pressure roller winding angle c before the envelope enters the entrance of the nip and, after the envelope comes out of the nip, the envelope winds around the pressure roller by a pressure roller winding angle δ. As a result, a total difference between the conveyance amount of the printed surface and the conveyance amount of the non-printed surface is t(ε+δ−α). Designing the pressure roller winding angles ε and δ to reduce t(ε+δ−α) enables reducing the envelope crease.

As described above, setting the entrance guide angle and the exit guide angle with respect to the straight line connecting the entrance of the nip and the exit of the nip to be within a predetermined range enables preventing the occurrence of the crease in both the sheet of plain paper printed on both sides and the envelope.

However appropriate conditions for both the entrance guide angle and the exit guide angle are different between the envelope and the sheet of plain paper. Therefore, it is desirable to switch the entrance guide angle and the exit guide angle depending on the type of sheet.

The fixing device in the embodiments of the present disclosure changes the entrance guide angle and the exit guide angle in conjunction with switching the pressing force between the fixing roller and the pressure roller depending on whether the image forming apparatus prints the toner image on the envelope or the sheet of plain paper in order to prevent the occurrence of the crease in the envelope and the sheet of plain paper and the occurrence of the sheet back curl in the sheet of plain paper.

In an aspect of the embodiments of the present disclosure, the fixing device includes the fixing rotator such as the fixing roller 1, the pressure rotator such as the pressure roller 2, the pressing plate such as a pressure arm 10, the pressing force adjuster such as a cam 9, the entrance guide such as the entrance guide 7, the exit guide such as the exit guide 8, and the transmission such as a first support arm 12 and a second support arm 13. The above-described parts with reference numerals are examples and illustrated in FIG. 1. The pressure rotator presses against the fixing rotator to form the nip. The pressure plate rotates about a rotation fulcrum such as a fulcrum 14 and presses the pressure rotator. The pressing force adjuster adjusts the pressing force of the pressure plate. The entrance guide guides a recording medium such as the sheet 5 entering the nip. The exit guide guides the recording medium ejected from the nip. The transmission transmits displacement of the pressure plate to the entrance guide and the exit guide.

The transmission transmits the displacement of the tip of the pressure plate to the entrance guide and the exit guide to move the entrance guide and the exit guide in conjunction with the displacement of the pressure plate that increases or decreases the pressing force. The above-described structure can prevent the occurrence of the crease in both the sheet of plain paper printed on both sides and the envelope.

The fixing device of the present embodiment has following features.

(1) One simple entrance guide is a simple structure.

(2) Not only the entrance guide but also the exit guide is movable in accordance with a change in the pressing force.

In other words, the fixing device includes a simple configuration to change a position of the entrance guide and a position of the exit guide when the pressing force adjuster changes the pressing force of the pressure rotator to press the fixing rotator. The above-described change is performed when the image forming apparatus prints the toner image on the envelope or both sides of the sheet of plain paper. The above-described configuration can give good print quality not including, for example, the envelope crease or the crease in the sheet of plain paper printed on both sides and the sheet back curl of the sheet of plain paper.

The following describes specific embodiments.

A first embodiment is described below.

Figure 2:
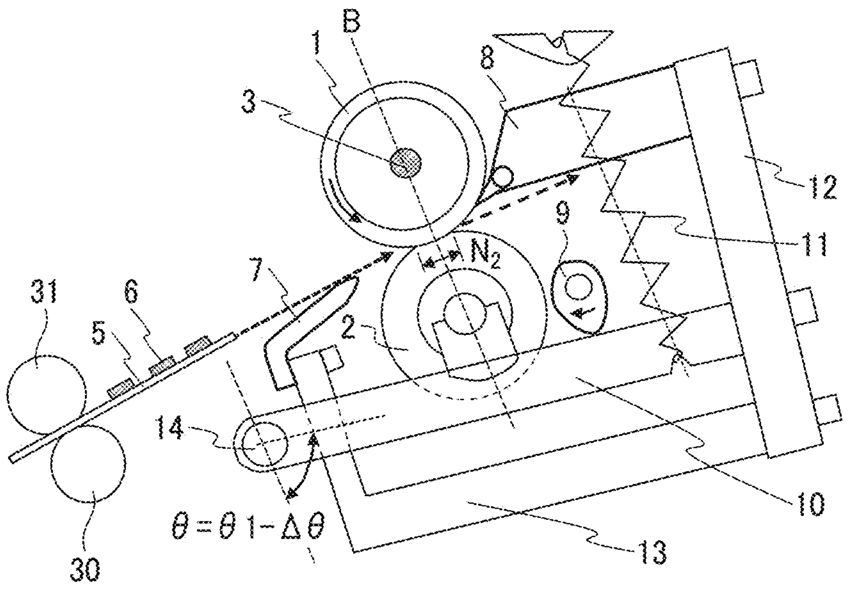
FIG. 2 is a diagram illustrating a configuration of the fixing device decreasing the pressing force according to the first embodiment.

FIGS. 1 and 2 are diagrams each illustrating a configuration of the fixing device according to the first embodiment of the present disclosure. In FIG. 1, the pressing force adjuster increases the pressing force. In FIG. 2, the pressing force adjuster decreases the pressing force. The pressing force adjuster, for example, decreases the pressing force when the image forming apparatus prints the toner image on the envelope and increases the pressing force when the image forming apparatus prints the toner image on the sheet of plain paper.

The fixing device of the present embodiment includes the fixing roller 1, the pressure roller 2, the heater 3, the entrance guide 7, the exit guide 8, the cam 9, the pressure arm 10, a pressure spring 11, the first support arm 12, and the second support arm 13. The above-described transmission includes a support coupled to the pressure arm 10, the entrance guide 7 and the exit guide 8. The support is configured, for example, by the first support arm 12 and the second support arm 13. The first support arm 12 is orthogonally coupled to the pressure arm 10. The second support arm 13 is coupled to the entrance guide 7. One end of the second support arm 13 is coupled to, for example, the first support arm 12, and the other end is coupled to the entrance guide 7.

The pressing force adjuster is configured by the cam 9 in contact with the pressure arm 10. The cam 9 rotates and stops at different positions in a rotation direction to increase or decrease the pressing force. The width of the nip is referred to as the nip width. A nip width N1 illustrated in FIG. 1 is greater than a nip width N2 illustrated in FIG. 2. For example, the nip width N1 is 7.7 mm, and the nip width N2 is 2.5 mm.

The sheet 5 as an example of a recording medium is conveyed as follows. After a transfer roller 30 transfers the toner image 6 from a photoconductor 31 onto the sheet 5, the sheet 5 enters the fixing device. In the fixing device, the sheet 5 enters the nip in which the fixing roller 1 is in contact with the pressure roller 2 and is heated and pressed to fix the toner image 6 onto the sheet 5. The nip is a portion indicated by N1 in FIG. 1 and indicated by N2 in FIG. 2. The entrance guide 7 is disposed near the entrance of the nip. The exit guide 8 is disposed near the exit of the nip. The entrance guide 7 and the exit guide 8 guide the sheet 5 conveyed.

In FIG. 1, the pressure spring 11 applies a force to the pressure arm 10 to generate the pressing force of the pressure roller 2 that presses the fixing roller 1. A position of the cam 9 changes the pressing force. The position of the cam 9 illustrated in FIG. 1 increases the pressing force. The position of the cam 9 illustrated in FIG. 2 decreases the pressing force. The pressure arm 10 is rotatable about the fulcrum 14. The cam 9 can set the pressure arm 10 at a plurality of positions in a rotation direction with respect to the fulcrum 14. When the sheet of plain paper passes through the fixing device, the cam 9 sets the position of the pressure arm 10 that sets the maximum pressing force. The position is referred to as a maximum pressure position. When the envelope passes through the fixing device, the cam 9 sets the position of the pressure arm 10 that decrease the pressing force from the maximum pressing force. The position is referred to as an envelope position. As described above, the cam 9 can change the pressing force to switch between an optimum condition for the envelope and an optimum condition for the sheet of plain paper. The pressure arm 10 is coupled to the first support arm 12. Since the first support arm 12 is coupled to the tip of the pressure arm the first support arm 12 moves with a large displacement.

The first support arm 12 is coupled to the exit guide 8, and the entrance guide 7 is coupled to the first support arm 12 via the second support arm 13. Rotating the cam 9 displaces the first support arm 12, and the displacement of the first support arm 12 moves the entrance guide 7 and the exit guide 8. These components illustrated in FIGS. 1 and 2 are fastened by screws. Thus, rotating the cam 9 as described above moves the entrance guide 7 and the exit guide 8.

The fixing device illustrated in FIGS. 1 and 2 has a configuration called a single link because the fixing device includes a single pressure arm 10. A single link mechanism in FIGS. 1 and 2 includes the transmission (that is, the first support arm 12 and the second support arm 13) for transmitting the displacement of the tip of the pressure arm 10 to the entrance guide 7 and the exit guide 8. The above-described configuration has a clear angular relationship between the first support arm 12 and the pressure arm 10 and can transmit the displacement of the tip of the pressure plate such as the pressure arm 10 to the entrance guide 7 and the exit guide 8 without reducing a displacement amount.

Figure 3:
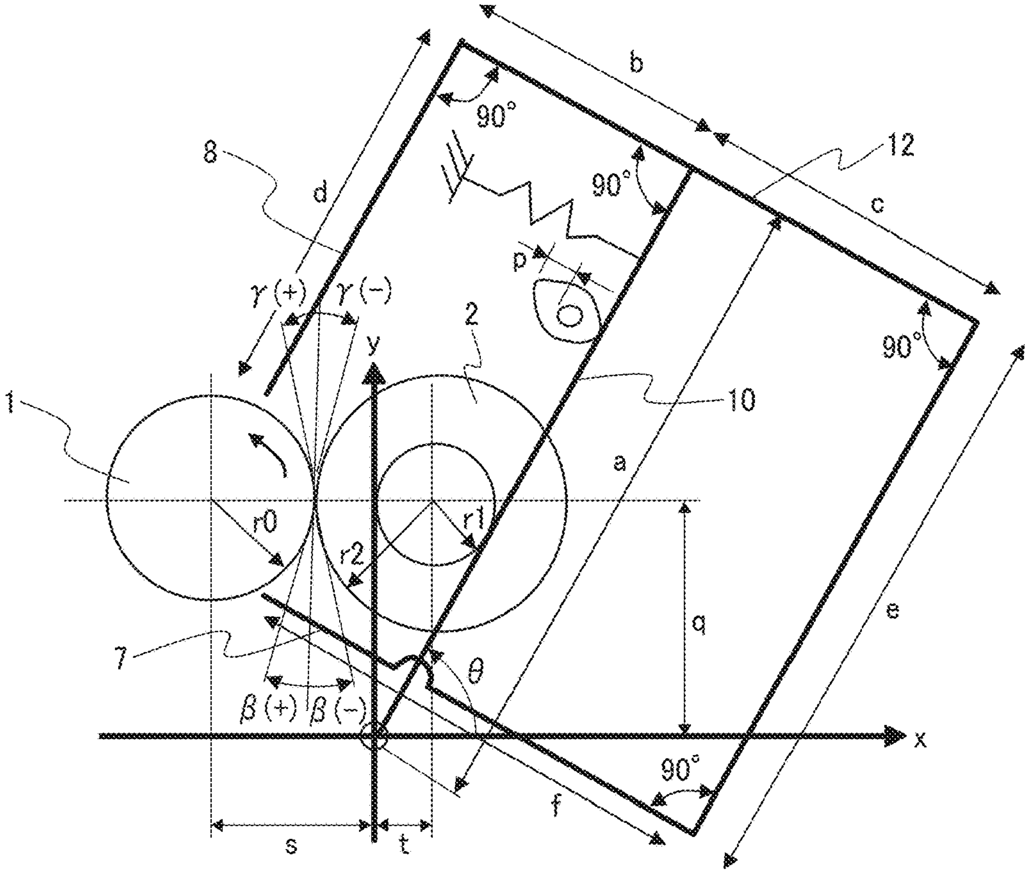
FIG. 3 is a diagram to illustrate link parameters of fixing device of FIGS. 1 and 2.

FIG. 3 is a diagram to illustrate link parameters in the fixing device according to the first embodiment. In FIG. 3, a position of the tip of the entrance guide 7 is expressed by link lengths c, e, and f from a position at which the pressure arm 10 intersects the first support arm 12 at a right angle, and a position of the tip of the exit guide 8 is expressed by link lengths b and d from the position at which the pressure arm 10 intersects the first support arm 12.

Specifically, the second support arm 13 as the second support includes a first portion extending from a coupling portion coupling to the first support arm 12, a second portion extending from a coupling portion coupling to the exit guide 8, and a bending point at which the first portion and the second portion intersect each other. The parameters a, b, c, d, e, and f are defined as follows:

The parameter a is a distance from the fulcrum 14 of the pressure arm 10 as the pressure plate that receives the pressing force from the cam 9 as the pressing force adjuster to a position at which the pressure arm 10 is coupled to the first support arm 12 as the first support;

The parameter b is a distance from the position at which the pressure arm 10 as the pressure plate that receives the pressing force from the cam 9 as the pressing force adjuster is coupled to the first support arm 12 as the first support to a position at which the first support arm 12 is coupled to the exit guide 8;

The parameter c is a distance from the position at which the pressure arm 10 as the pressure plate that receives the pressing force from the cam 9 as the pressing force adjuster is coupled to the first support arm 12 as the first support to a position at which the first support arm 12 is coupled to the second support arm 13 as the second support; The parameter d is a distance from the position at which the first support arm 12 as the first support is coupled to the exit guide 8 to a position of a tip of the exit guide 8;

The parameter e is a distance from the position at which the first support arm 12 as the first support is coupled to the second support arm 13 as the second support to the bending point; and The parameter f is a distance from the bending point to a tip of the entrance guide 7.

FIG. 3 includes coordinates. The origin of the coordinates is the fulcrum 14 of the pressure arm 10, and X-axis is parallel to a straight line connecting the center of the fixing roller 1 and the center of the pressure roller 2. An angle formed between the pressure arm 10 and the x-axis is defined as an angle θ. Hereinafter, the angle θ of the pressure arm 10 with respect to the straight line connecting the centers of the fixing roller 1 and the pressure roller 2 is referred to as a "pressure arm angle θ". The pressure arm angle θ is represented by θ1 in FIG. 1 and by θ1−Δθ in FIG. 2.

With reference to FIG. 3, the position (x,y) of the tip of the entrance guide is represented by the following Expression 1 and Expression 2.

$$x=(a-e)\cos\theta+(c-f)\sin\theta \quad \text{(Expression 1)}$$

$$y=(a-e)\sin\theta+(f-c)\cos\theta \quad \text{(Expression 2)}$$

The position (x,y) of the tip of the exit guide is represented by the following Expression 3 and Expression 4.

$$x=(a-d)\cos\theta-b\sin\theta \quad \text{(Expression 3)}$$

$$y=(a-d)\sin\theta+b\cos\theta \quad \text{(Expression 4)}$$

Figure 4:
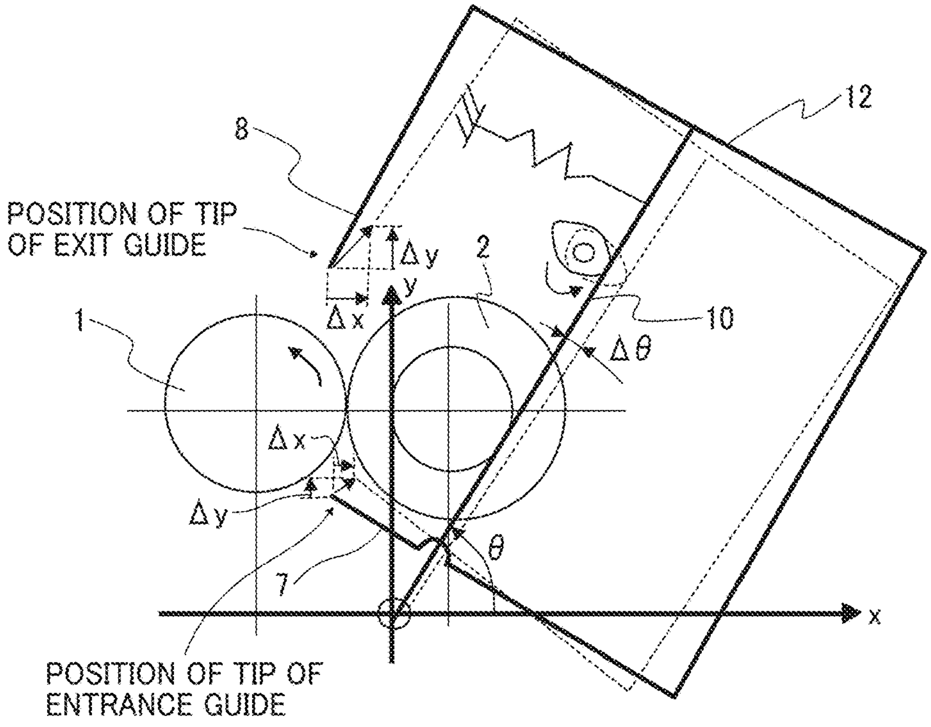
FIG. 4 is a diagram to illustrate change in the position of the tip of an entrance guide and change in the position of the tip of an exit guide that are caused by rotation of a pressure arm rotated by a cam in the fixing device of FIGS. 1 and 2.

FIG. 4 illustrates change in the position of the tip of the entrance guide 7 and change in the position of the tip of the exit guide 8 after the cam 9 rotates to pivot the pressure arm 10 by Δθ in the fixing device of FIG. 3 to change a pressure condition from a pressure condition for the sheet of plain paper to the pressure condition for the envelope (that is, to reduce the pressing force). In FIG. 4, for the sake of explanation, the positions of the tips of the entrance guide 7 and the exit guide 8 are illustrated at positions away from the center of the nip. In FIG. 4, broken lines express positions of the above components in the pressure condition for the envelope that reduces the pressing force.

Table 1 illustrates an example of values of link parameters of the fixing device in FIG. 3.

TABLE 1

| p | q | r0 | r1 | r2 | s | t | θ |
|---|---|---|---|---|---|---|---|
| 52 mm | 50 mm | 15 mm | 13 mm | 17 mm | 25 mm | 7 mm | 60° |
| a | b | c | d | e | f | Δθ | |
| 100 mm | 37 mm | 20 mm | 58 mm | 66 mm | 52 mm | 2.14° | |

Table 2 illustrates appropriate ranges of the entrance guide angle and the exit guide angle.

TABLE 2

| | Appropriate Guide Angle Range | |
|---|---|---|
| | Plain paper | Envelope |
| Entrance guide angle β | 15 to 25° | −20 to 0° |
| Exit guide angle γ | 18 to 24° | −10 to 5° |

Figure 5:
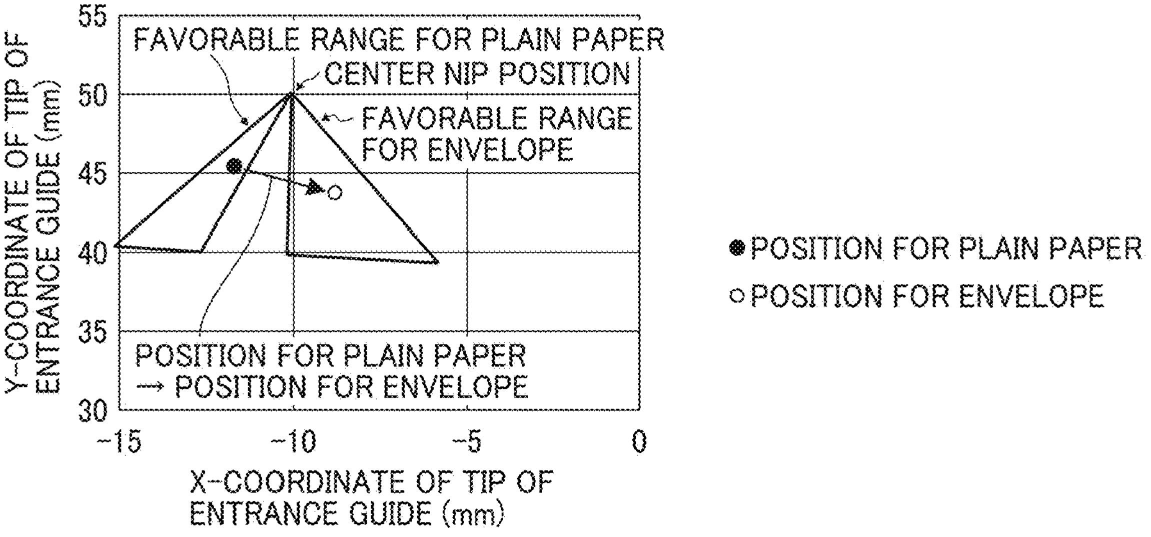
FIG. 5 is a graph to illustrate an example of the change in the position of the tip of the entrance guide in the fixing device of FIGS. 1 and 2.
Figure 6:
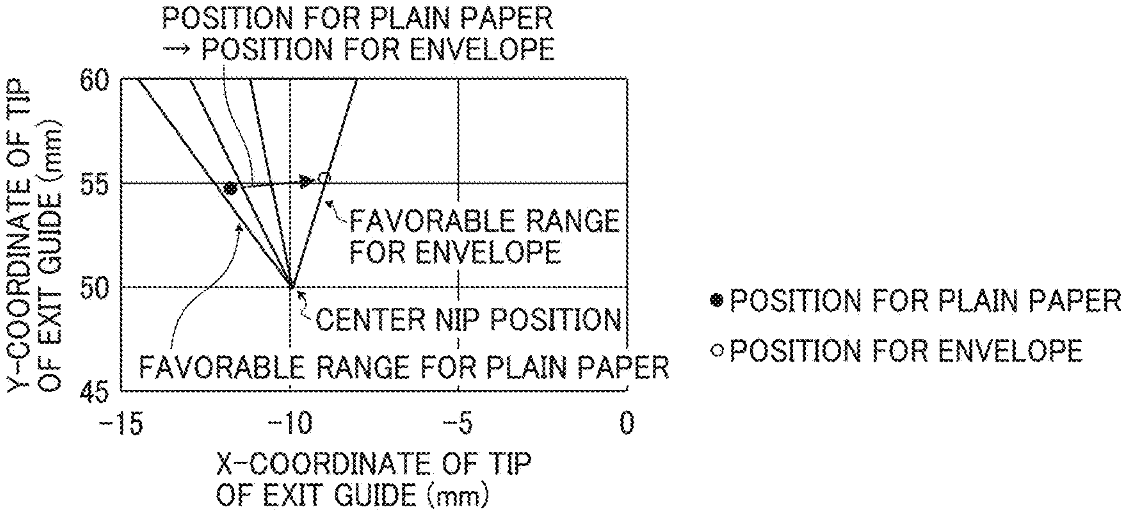
FIG. 6 is a graph to illustrate an example of the change in the position of the tip of the exit guide in the fixing device of FIGS. 1 and 2.

Based on the conditions illustrated in Table 1 and Table 2, FIGS. 5 and 6 illustrate changes in the positions of the tips of the entrance guide 7 and the exit guide 8 when rotating the cam 9 pivots the pressure arm 10 to change the pressure condition from the pressure condition for the sheet of plain paper to the pressure condition for the envelope that reduces the pressing force. FIG. 5 is a graph to illustrate an example of the change in the position of the tip of the entrance guide. FIG. 6 is a graph to illustrate an example of the change in the position of the tip of the exit guide. FIGS. 5 and 6 illustrate movements from proper positions of the tips of the entrance guide 7 and the exit guide 8 for the sheet of plain paper to proper positions of the tips of the entrance guide 7 and the exit guide 8 for the envelope. The movements are caused by rotating the cam 9 to pivot the pressure arm 10 to reduce the pressing force in the fixing device having the link parameters illustrated in Table 1.

The following Expressions 5 to 8 calculate displacement amounts Δx in the x direction and displace amounts Δy in the y direction when the pressure arm angle θ is changed by Δθ. The x direction is orthogonal to the sheet conveyance direction, and the y direction is the sheet conveyance direction.

The displacement amounts in the position of the tip of the entrance guide $$\Delta x=[(e-a)\sin\theta+(c-f)\cos\theta]\cdot\Delta\theta \quad \text{(Expression 5)}$$

$$\Delta y=[(a-e)\cos\theta-(f-c)\sin\theta]\cdot\Delta\theta \quad \text{(Expression 6)}$$

The displacement amounts in the position of the tips of the exit guide $$\Delta x=[(d-a)\sin\theta-b\cos\theta]\cdot\Delta\theta \quad \text{(Expression 7)}$$

$$\Delta y=[(a-d)\cos\theta-b\sin\theta]\cdot\Delta\theta \quad \text{(Expression 8)}$$

Figure 7:
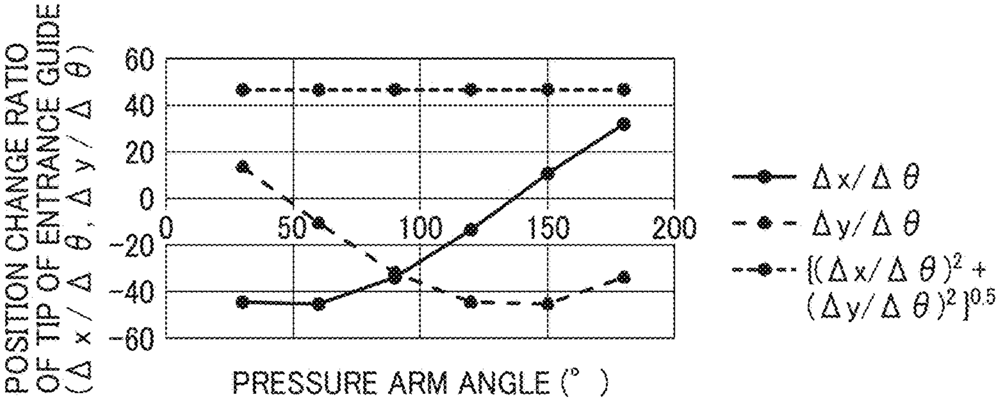
FIG. 7 is a graph illustrating relationships between the pressure arm angle θ and position change ratios (Δx/Δθ and Δy/Δθ) of the tip of the entrance guide in the fixing device of FIGS. 1 and 2.
Figure 8:
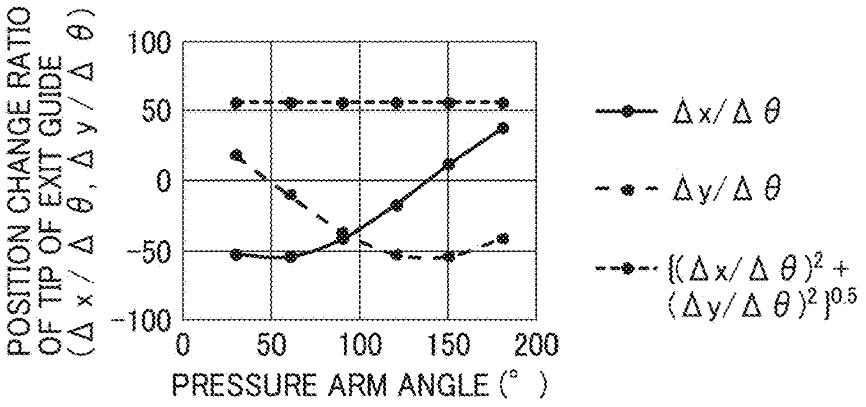
FIG. 8 is a graph illustrating relationships between the pressure arm angle θ and position change ratios (Δx/Δθ and Δy/Δθ) of the tip of the exit guide in the fixing device of FIGS. 1 and 2.

FIG. 7 is a graph to illustrate a relationship between the pressure arm angle and a position change ratio of the tip of the entrance guide in the fixing device having the link parameters of Table 1. FIG. 8 is a graph to illustrate a relationship between the pressure arm angle and a position change ratio of the tip of the exit guide in the fixing device having the link parameters of Table 1. The position change ratio of the tip of the entrance guide 7 or the exit guide 8 is calculated as (Δx/Δθ, Δy/Δθ) where (Δx, Δy) is the displacement amount of the tip of the entrance guide 7 or the exit guide 8, and Δθ is an amount of change in the pressure arm angle. In FIGS. 7 and 8, $\{(\Delta x/\Delta\theta)^2+(\Delta y/\Delta\theta)^2\}^{0.5}$ is reference data that compares the order of value of (Δx/Δθ) with the order of value of (Δy/Δθ).

When the expressions 5 to 8 are expressed as Δx=Jx(θ)·Δθ and Δy=Jy(θ)·Δθ, FIGS. 7 and 8 illustrate Jx(θ) and Jy(θ).

When the pressure arm 10 reduces the pressure, the amount of change in the pressure arm angle Δθ is smaller than zero in FIG. 3, and Δx=Jx(θ)·Δθ needs to be zero or more to move the tip of the entrance guide and the tip of the exit guide from their positions for the sheet of plain paper to their positions for the envelope. Regarding Δy=Jy(θ)·Δθ, since it is desirable that the entrance guide and the exit guide is not too close to the nip during movement, Δy≤0 for the entrance guide 7 and Δy≥0 for the exit guide 8 are the best condition.

In addition, Jx(θ) and Jy(θ) need to be the following values.

Regarding the entrance guide, since Δx needs to be zero or more and Δθ is zero or less (Δx≥0, Δθ≤0), Jx(θ)=Δx/Δθ is zero or less.

In addition, regarding the entrance guide, Jy(θ)=Δy/Δθ≥0 is the best condition because Δy≤0 is the best condition and Δθ is zero or less as described above (Δy≤0, Δθ≤0).

Regarding the exit guide, since Δx needs to be zero or more and Δθ is zero or less (Δx≥0, Δθ≤0), Jx(θ)=Δx/Δθ is zero or less.

In addition, regarding the exit guide, Jy(θ)=Δy/Δθ≤0 is the best condition because Δy≥0 is the best condition and Δθ is zero or less as described above (Δy≥0, Δθ≤0).

Figure 9:
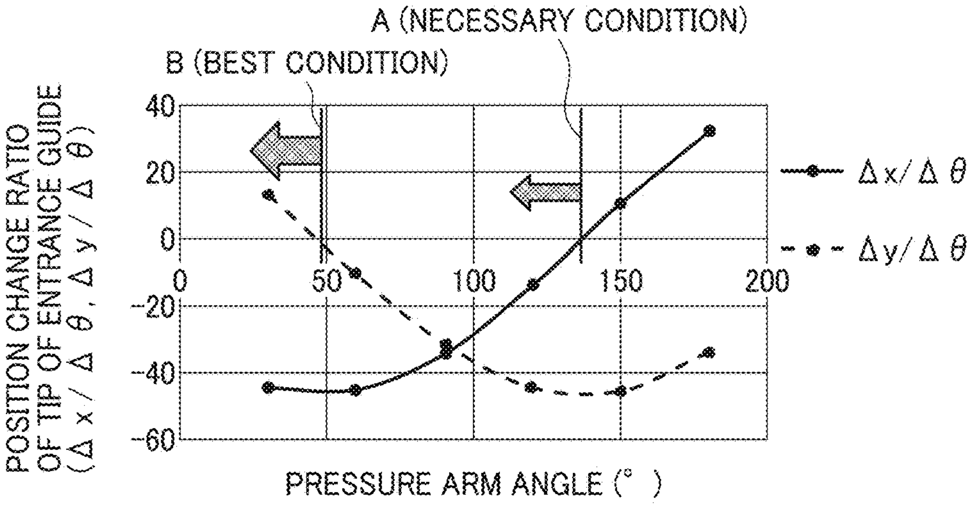
FIG. 9 is a graph illustrating relationships between the pressure arm angle θ and the position change ratios (Δx/Δθ and Δy/Δθ) of the tip of the entrance guide in the fixing device of FIGS. 1 and 2 to illustrate appropriate conditions for the pressure arm angle θ.
Figure 10:
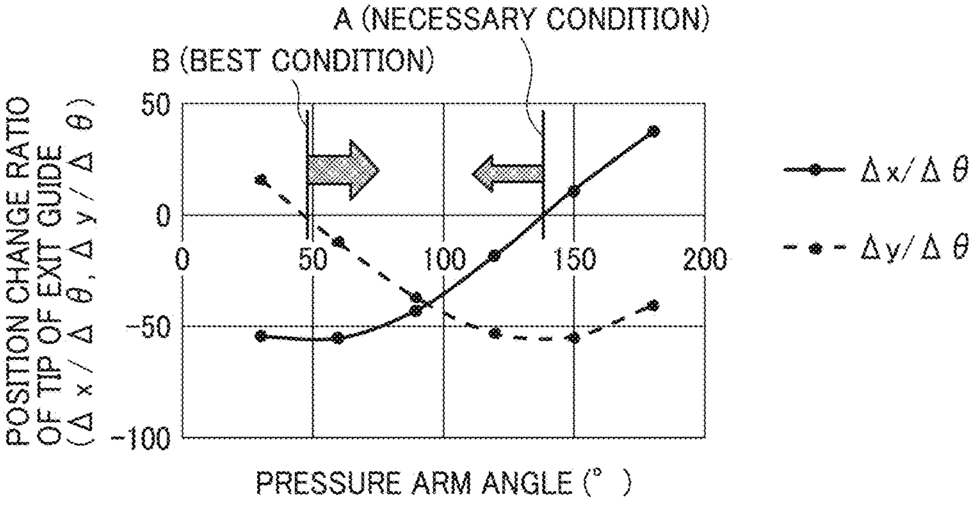
FIG. 10 is a graph illustrating relationships between the pressure arm angle θ and the position change ratios (Δx/Δθ and Δy/Δθ) of the tip of the entrance guide in the fixing device of FIGS. 1 and 2 to illustrate appropriate conditions for the pressure arm angle θ.

The above-described conditions are illustrated in FIGS. 9 and 10. FIG. 9 is a graph illustrating relationships between the pressure arm angle θ and the position change ratios (Δx/Δθ and Δy/Δθ) of the tip of the entrance guide in the fixing device of FIGS. 1 and 2 to illustrate appropriate conditions for the pressure arm angle θ regarding the entrance guide. FIG. 10 is a graph illustrating relationships between the pressure arm angle θ and the position change ratios (Δx/Δθ and Δy/Δθ) of the tip of the exit guide in the fixing device of FIGS. 1 and 2 to illustrate appropriate conditions for the pressure arm angle θ regarding the exit guide.

The pressure arm angle θ must simultaneously satisfy the entrance guide condition in FIG. 9 and the exit guide condition in FIG. 10. FIGS. 9 and 10 each include a line A and line B. The line A in each of FIGS. 9 and 10 means a necessary condition in which the tip of the entrance guide 7 and the tip of the exit guide 8 moves from left to right in FIG. 4 when the pressure arm reduces the pressure. The pressure arm angle must be a value indicated by the line Ain each of FIGS. 9 and 10 or less.

In addition, the line B in FIG. 9 illustrates the best condition of the pressure guide angle for the entrance guide, and the line B in FIG. 10 illustrates the best condition of the pressure guide angle for the exit guide. In the best condition, the tip of the entrance guide and the tip of the exit guide is not too close to the nip, and a movement amount of each tip in the sheet conveyance direction is small while the pressure arm moves the entrance guide and the exit guide and reduces the pressure. As illustrated in FIG. 9, the best condition of the pressure guide angle for the entrance guide is the value indicated by the line B or less. As illustrate in FIG. 10, the best condition of the pressure guide angle for the exit guide is the value indicated by line B or more.

The pressure arm has one pressure arm angle θ regarding the entrance guide 7 and the exit guide 8. FIGS. 9 and 10 illustrates the necessary condition of the pressure arm guide angle that is less than 135°. The pressure guide angle less than 135° is a range that is a left side from the line A in FIGS. 9 and 10. The range satisfies $\Delta x>0$. In addition to the necessary condition, the pressure guide angle in the vicinity of θ=45° satisfies the best condition indicated by the line B in each of FIGS. 9 and 10 (that is, the entrance guide condition and the exit guide condition regarding Δy).

The above is expressed by the link parameters as follows.

Regarding the entrance guide, $Jx(\theta)\leq 0$.

Based on $Jx(\theta)=\Delta x/\Delta\theta$ and (Expression 5), the above inequality expression gives the following inequality expression.

$$(e-a)\sin\theta\leq(f-c)\cos\theta$$

$$\tan\theta\leq(f-c)/(e-a)$$

$$\theta\leq\tan^{-1}[(f-c)/(e-a)] \quad \text{(Expression 9)}$$

Regarding the entrance guide, $Jy(\theta)\geq 0$.

Based on $Jy(\theta)=\Delta y/\Delta\theta$ and (Expression 6), the above inequality expression gives the following inequality expression.

$$(a-e)\cos\theta\geq(f-c)\sin\theta$$

$$\text{Tan}\,\theta\leq(a-e)/(f-c).$$

$$\theta\leq\tan^{-1}[(a-e)/(f-c)] \quad \text{(Expression 10).}$$

Regarding the exit guide, $Jx(\theta)\leq 0$.

Based on $Jx(\theta)=\Delta x/\Delta\theta$ and (Expression 7), the above inequality expression gives the following inequality expression.

$$(d-a)\sin\theta\leq b\cos\theta$$

$$\tan\theta\leq b/(d-a).$$

$$\theta\leq\tan^{-1}(b/(d-a) \quad \text{(Expression 11).}$$

Regarding the exit guide, $Jy(\theta)\leq 0$.

Based on $Jy(\theta)=\Delta y/\Delta\theta$ and (Expression 8), the above inequality expression gives the following inequality expression.

$$(a-d)\cos\theta\leq b\sin\theta$$

$$\tan\theta\geq(a-d)/b$$

$$\theta\geq\tan^{-1}[(a-d)/b] \quad \text{(Expression 12).}$$

Based on the above, the necessary condition (that is, $\Delta x\geq 0$, the condition indicated by the line A) is expressed as follows using a minimum function: min (x). (The minimum function chooses the minimum value in parentheses.)

$$\theta\leq\min(\tan^{-1}[(f-c)/(e-a)],\ \tan^{-1}[b/(d-a)]). \quad \text{(Expression 13)}$$

The best condition (that is, the conditions of Δy, the condition indicated by the line B) is expressed as follows.

$$\tan^{-1}[(a-d)/b]\leq\theta\leq\tan^{-1}(b/(d-a) \quad \text{(Expression 14)}$$

Based on the link parameters in Table 1, The above-described conditions are calculated as follows.

From the necessary condition, θ≤min (136.7,138.6)=136.7°

Figure 11:
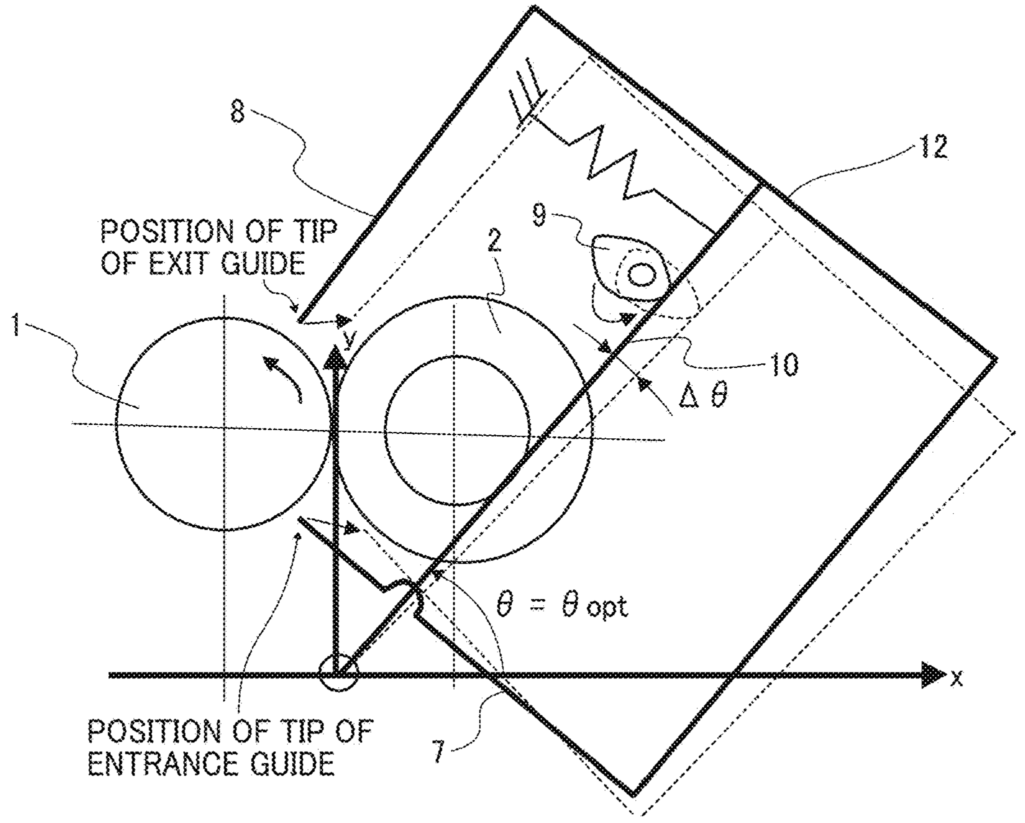
FIG. 11 is a schematic diagram to illustrate the position of the tip of the entrance guide and the position of the tip of the exit guide in the best condition of the pressure arm angle θopt in the fixing device of FIGS. 1 and 2.

From the best condition, 46.7°≤θ≤48.6° Based on the above-described calculation results of the pressure arm angle θ, the best pressure arm angle θopt is set to 47°. FIG. 11 illustrates the configuration of the fixing device having the best pressure arm angle 47°. FIG. 11 illustrates a position of the tip of the entrance guide and a position of the tip of the exit guide under the best condition of the pressure arm angle. Under the best condition, the displacement Δy of the tip of the entrance guide 7 and the displacement Δy of the tip of the exit guide 8 in the y direction (that is the sheet conveyance direction) is 0 (Δy=0). In other words, the position of the tip of the entrance guide 7 and the position of the tip of the exit guide 8 do not change in the sheet conveyance direction.

As described above, in the fixing device of the present embodiment, the position of the tip of the entrance guide 7 and the position of the tip of the exit guide 8 change along the straight line connecting the center of the fixing roller 1 and the center of the pressure roller 2 when the angle θ of the pressure arm 10 with respect to the straight line changes between the angle to increase the pressing force and the angle to decrease the pressing force. In the above-described configuration, a direction of the displacement of the entrance guide 7 and a direction of the displacement of the exit guide 8 are along the straight line connecting the center of the fixing roller 1 and the center of the pressure roller 2 when the cam 9 changes the position of the pressure arm 10 between the position to increase the pressing force and the position to decrease the pressing force. The above-described configuration can prevent the occurrence of the crease in both the envelope and the sheet of plain paper printed on both sides.

The tip of the entrance guide 7 and the tip of the exit guide 8 do not approach the nip in a direction defined by the straight line connecting the entrance of the nip and the exit of the nip when the angle θ of the pressure arm 10 with respect to the straight line connecting the center of the fixing roller 1 and the center of pressure roller 2 is changed between the angle to increase the pressing force and the angle to decrease the pressing force. In the above-described configuration, the cam 9 changes the position of the pressure arm 10 between the position to increase the pressing force and the position to decrease the pressing force and moves the entrance guide 7 and the exit guide 8. In the direction of the displacement of the entrance guide 7 and the direction of the displacement of the exit guide 8, the entrance guide 7 and the exit guide 8 do not approach the nip. In other words, the entrance guide 7 and the exit guide 8 do not approach the nip in the direction of the straight line connecting the entrance of the nip and the exit of the nip that is orthogonal to the straight line connecting the center of the fixing roller 1 and the center of the pressure roller 2. Thus, the entrance guide 7 and the exit guide 8 can displace without damaging the fixing roller 1 and the pressure roller 2. The above-described configuration can prevent the occurrence of the crease in both the envelope and the sheet of plain paper printed on both sides.

In the fixing device of the present embodiment, it is preferable that the pressure arm angle θ with respect to the straight line connecting the center of the fixing roller 1 and the center of the pressure roller 2 is in the range from 46° to 136°. The above describes an angle range of the pressure arm angle θ with respect to the straight line connecting the center of the fixing roller 1 and the center of the pressure roller 2 that can prevent the occurrence of the crease in both the envelope and the sheet of plain paper printed on both sides. In addition, Expression 14 gives the angle range of the pressure arm angle θ with respect to the straight line connecting the center of the fixing roller 1 and the center of the pressure roller 2, that is, the angle range that can prevent the occurrence of the crease in both the envelope and the sheet of plain paper printed on both sides.

The following describes results of tests that evaluated how the above-described configuration reduces the envelope crease with reference to FIG. 34. The envelope crease was evaluated under the following test conditions, and the results are illustrated in Table 3.

Test Conditions:

Nip width: 2.5 mm

Fixing temperature 210° C.

Fixing roller had the convex shape in the nip and fixing roller diameter 30 mm.

Fixing roller rotational peripheral speed: 180 mm/s

Parameters of Envelopes Used in the Tests:

Basis Weight: 70 g/m$^2$ Size: 90 mm×205 mm (Japanese typical envelope size: nanagatayongou)

Basis Weight 80 g/m$^2$ Size: 120 mm×235 mm (Japanese typical envelope size: nanagatasangou)

Basis weight 90 g/m$^2$ Size: 104.7 mm×241.3 mm (COM10)

Basis Weight 100 g/m$^2$ Size: 120 mm×235 mm (Japanese typical envelope size: nanagatasangou)

In the test, five envelopes of each type described above were printed, and a length of the crease occurred at the end of each envelope on the non-printed surface was measured. The average of five crease lengths was calculated in each type. Finally, an average crease length was calculated from four crease length averages of four above-described types of envelopes.

Table 3 illustrates the results of the envelope creases occurred when the entrance guide angle β and the exit guide angle γ were changed. The entrance guide angle β and the exit guide angle γ are defined as illustrated in FIG. 33.

TABLE 3

| No. | Nip width (mm) | Entrance Guide Angle β (°) | Exit Guide Angle γ (°) | Fixing Temperature (° C.) Center | Fixing Temperature (° C.) End |
|---|---|---|---|---|---|
| 1 | 2.5 | 20 | 18 | 210 | 210 |
| 2 | 2.5 | 20 | 12 | 210 | 210 |
| 3 | 2.5 | 20 | 5 | 210 | 210 |
| 4 | 2.5 | 0 | 18 | 210 | 210 |
| 5 | 2.5 | 0 | 12 | 210 | 210 |
| 6 | 2.5 | 0 | 5 | 210 | 210 |
| 7 | 2.5 | −20 | 18 | 210 | 210 |
| 8 | 2.5 | −20 | 12 | 210 | 210 |
| 9 | 2.5 | −20 | 5 | 210 | 210 |

| No. | Lengths (mm) of creases at the ends of the envelopes on non-printed surfaces in the envelopes having the following basis weights and sizes: 70 g/m$^2$ 90 mm × 205 mm Thin envelope | 80 g/m$^2$ 120 mm × 235 mm Thin envelope | 90 g/m$^2$ 104.7 mm × 241.3 mm Plain envelope | 100 g/m$^2$ 120 mm × 235 mm Thick envelope | Total length (mm) | Average crease length of four types of envelopes (mm) |
|---|---|---|---|---|---|---|
| 1 | 58 | 46 | 30 | 0 | 134 | 33.5 |
| 2 | 33 | 13 | 0 | 0 | 46 | 11.5 |
| 3 | 0 | 0 | 0 | 0 | 0 | 0 |
| 4 | 37 | 38 | 25 | 0 | 100 | 25 |
| 5 | 0 | 0 | 0 | 0 | 0 | 0 |
| 6 | 0 | 0 | 0 | 0 | 0 | 0 |
| 7 | 30 | 0 | 0 | 0 | 30 | 7.5 |
| 8 | 0 | 0 | 0 | 0 | 0 | 0 |
| 9 | 0 | 0 | 0 | 0 | 0 | 0 |

Figure 12A:
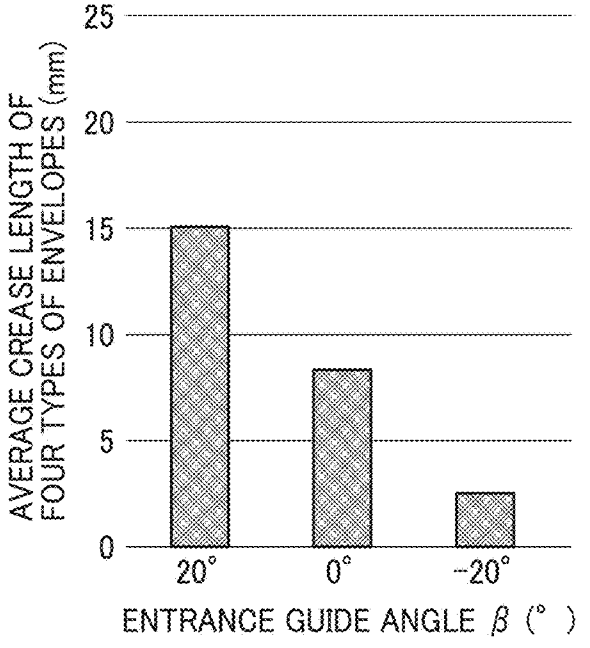
FIG. 12A is a graph illustrating a relationship between an envelope crease length and an entrance guide angle.
Figure 12B:
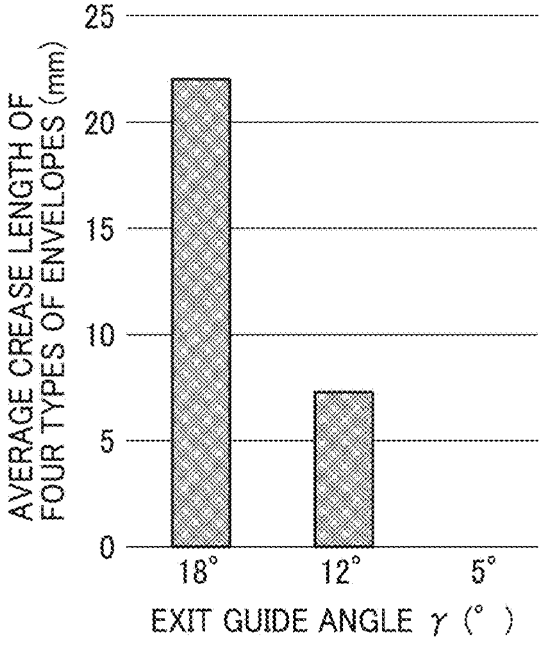
FIG. 12B is a graph illustrating a relationship between the envelope crease length and an exit guide angle.

Based on the results of the table 3, the average envelope crease length in each entrance guide angle β and the average envelope crease length in each exit guide angle γ were calculated and illustrated in FIGS. 12A and 12B. FIG. 12A is a graph illustrating the relationship between the envelope crease length and the entrance guide angle β FIG. 12B is a graph illustrating the relationship between the envelope crease length and the exit guide angle γ. As illustrated in FIGS. 12A and 12B, the smaller the entrance guide angle β and the exit guide angle γ are, (the nearer to the pressure roller the tip of the entrance guide 7 and the tip of the exit guide 8 are) the shorter the envelope crease is. A reason why the entrance guide angle β=20° causes a long envelope crease is as follows. Under the entrance guide angle β=20°, the sheet enters the nip so as to wind around the fixing roller. As a result, an effective nip width becomes, for example 4.5 mm, wider than a nip width, for example 2.5 mm, formed by the pressure roller 2 pressing the fixing roller 1. The wider nip width increases the difference between velocities of both sides of the envelope, which causes the long envelope crease.

Table 4 provides the envelope crease in each of combinations of the entrance guide angles and the exit guide angles in table 3 and other results of tests. Table 4 gives a condition in which the envelope crease length is zero, that is, the entrance guide angle β≤0° and the exit guide angle γ≤12°.

TABLE 4

Average crease length (mm) of four types of envelopes in Table 3

| | | Exit guide angle γ (°) 18 | 12 | 5 | 0 | −10 |
|---|---|---|---|---|---|---|
| Entrance guide angle β (°) | 20 | 33.5 | 11.5 | 0 | 0 | 0 |
| | 0 | 25 | 0 | 0 | 0 | 0 |
| | −20 | 7.5 | 0 | 0 | 0 | 0 |

FIG. 34 illustrates the results in Table 4.

As described above, the fixing device according to the first embodiment of the present disclosure can prevent the occurrence of the crease in both the envelope and the sheet of plain paper printed on both sides.

Next, a description is given of a fixing device according to a second embodiment.

The fixing device according to the first embodiment includes the simple single link mechanism that changes the positions of the tips of the entrance guide 7 and the exit guide 8 from the positions suitable for reducing the crease in the sheet of plain paper and the sheet back curl of the sheet of plain paper to the positions suitable for reducing the envelope crease in conjunction with the change in the pressure arm angle of the pressure arm 10 to reduce the pressing force. In the single link mechanism, since the rotation of the pressure arm 10 around the fulcrum changes the angles of the entrance guide 7 and the exit guide 8 with respect to the sheet conveyance direction, as illustrated in FIG. 11, the pressure arm angle θ is 47° in the best condition, that is, an inclined angle with respect to the straight line connecting the center of the fixing roller 1 and the center of the pressure roller 2. As a result, the pressing force of the pressure arm 10 is not efficiently applied to the fixing roller 1. This point is improved in the second embodiment.

Figure 13:
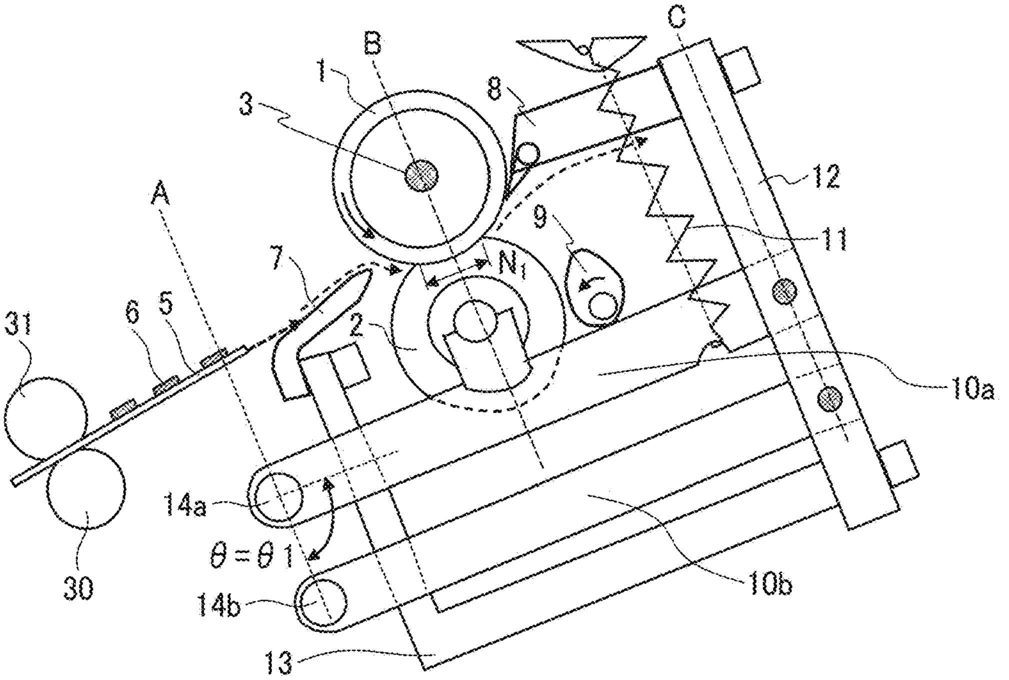
FIG. 13 is a diagram illustrating a configuration of the fixing device increasing the pressing force according to a second embodiment of the present disclosure.

The fixing device according to the second embodiment includes a parallel link mechanism. In the parallel link mechanism, the first support arm 12 is in parallel to the straight line connecting the center of the fixing roller 1 and the center of the pressure roller 2. FIG. 13 is a diagram illustrating the fixing device increasing the pressing force.

Figure 14:
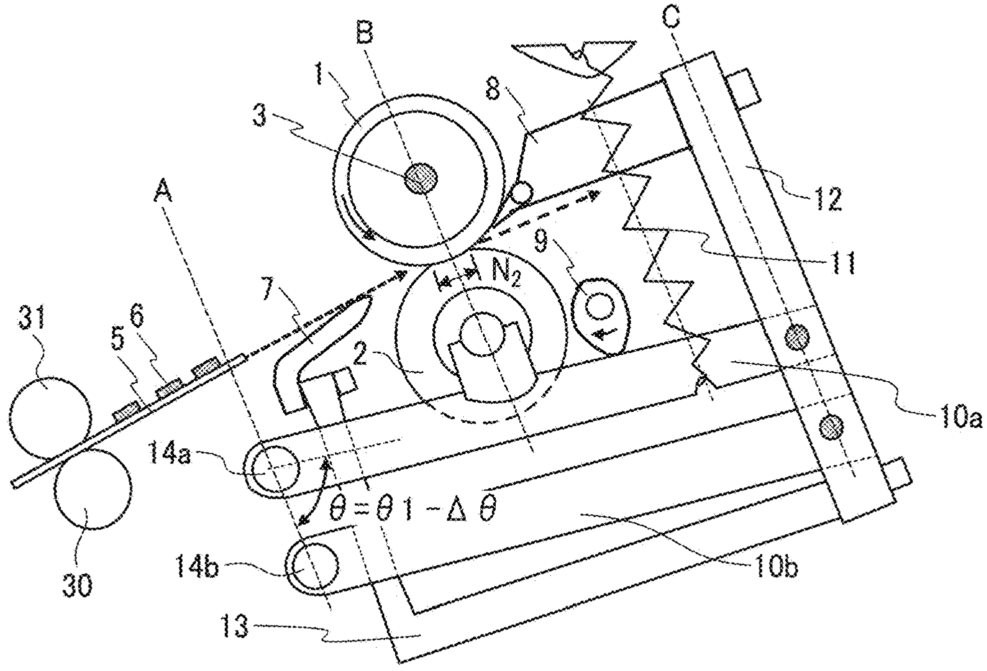
FIG. 14 is a diagram illustrating a configuration of the fixing device decreasing the pressing force according to the second embodiment.

FIG. 14 is a diagram illustrating the fixing device decreasing the pressing force. FIG. 13 illustrates an example of a condition to increase the pressing force when the image forming apparatus prints the toner image on the sheet other than the envelope. FIG. 14 illustrates an example of a condition to decrease the pressing force when the image forming apparatus prints the toner image on the envelope. The fixing device according to the second embodiment includes two pressure arms 10*a* and 10*b* as two pressure plates, which is a different point from the fixing device according to the first embodiment.

The transmission in the fixing device according to the second embodiment includes the support rotatably coupled to the two pressure arms 10*a* and 10*b* and coupled to the entrance guide 7 and the exit guide 8. The transmission includes, for example, the first support arm 12 as a first support and the second support arm 13 as a second support. The first support arm 12 is coupled to the two pressure arms 10*a* and 10*b* and coupled to the exit guide 8. The second support arm 13 is coupled to the first support arm 12 and the entrance guide 7.

In FIG. 13, the pressure spring 11 applies the force to the pressure arm 10 to generate the pressing force of the pressure roller 2 that presses the fixing roller 1. The position of the cam 9 changes the pressing force. The position of the cam 9 illustrated in FIG. 13 increases the pressing force. The position of the cam 9 illustrated in FIG. 14 decreases the pressing force. The pressure arm 10*a* is rotatable about the fulcrum 14*a*, and the pressure arm 10*b* is rotatable about the fulcrum 14*b*. The pressure arms 10*a* and 10*b* are coupled to the first support arm 12. The pressure arm 10*a* is provided in parallel with the pressure arm 10*b*. A straight line connecting the fulcrum 14*a* of the pressure arm 10*a* and the fulcrum 14*b* of the pressure arm 10*b* is parallel to the straight line connecting the center of the fixing roller 1 and the center of the pressure roller 2.

The first support arm 12 is rotatably coupled to the tips of the pressure arm 10*a* and the tip of the pressure arm 10*b* and forms the parallel link mechanism. Specifically, the first support arm 12 is always parallel to the straight line connecting the center of the fixing roller 1 and the center of the pressure roller 2. In addition, the first support arm 12 is always parallel to the straight line connecting the fulcrum 14*a* of the pressure arm 10*a* and the fulcrum 14*b* of the pressure arm 10*b*. The first support arm 12 is coupled to the exit guide 8. In addition, the first support arm 12 is coupled to the entrance guide via the second support arm 13. Rotating the cam 9 moves the entrance guide 7 and the exit guide 8 by a displacement of the first support arm 12. In FIGS. 13 and 14, these components are fastened by screws.

As described above, the fixing device according to the second embodiment uses the parallel link mechanism including the first support arm 12 to avoid the occurrence of the crease in both the envelope and the sheet of plain paper printed on both sides. When the pressure arm 10 pivots, the above-described configuration moves the positions of the tips of the entrance guide 7 and the exit guide 8 in the direction orthogonal to the sheet conveyance direction not in the sheet conveyance direction.

Figure 15:
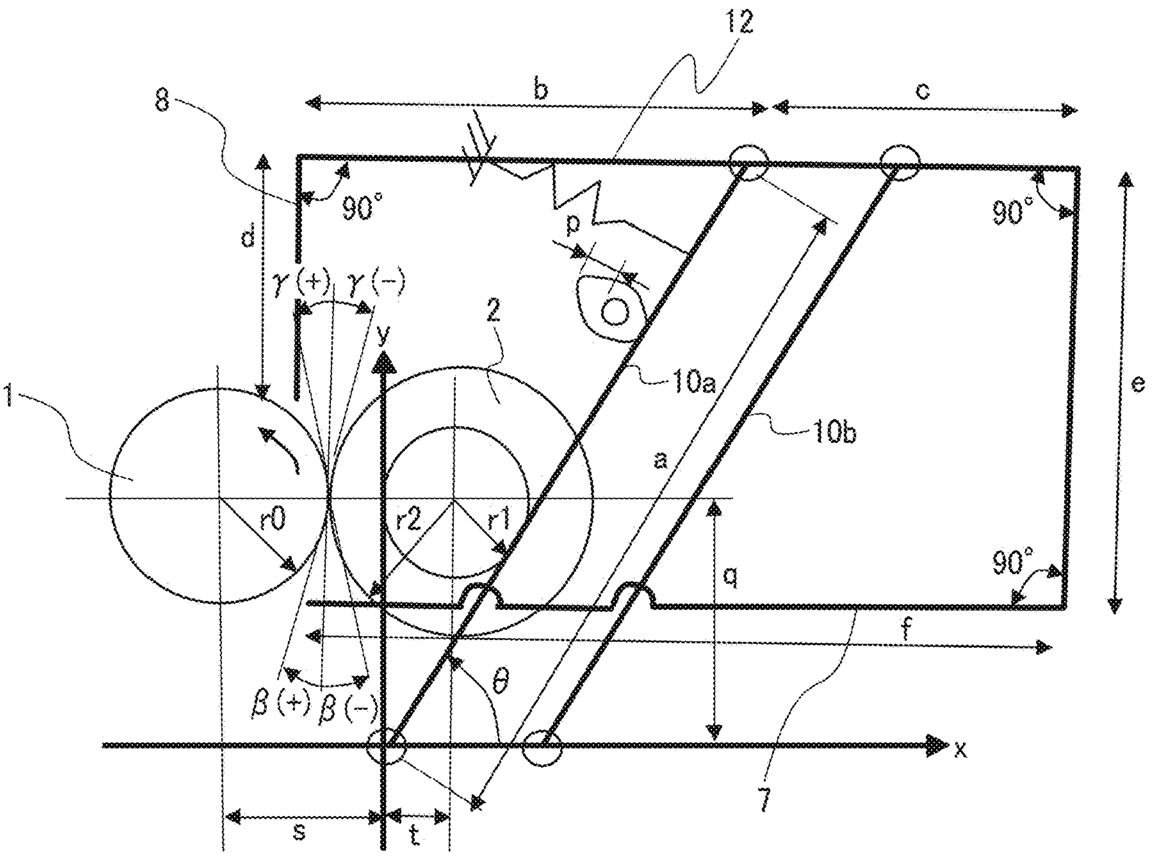
FIG. 15 is a diagram to illustrate the link parameters of fixing device of FIGS. 13 and 14.

FIG. 15 is a diagram to illustrate link parameters in the fixing device according to the second embodiment. In FIG. 15, the position of the tip of the entrance guide 7 is expressed by link lengths c, e, and f from the position at which the pressure arm 10*a* intersects the first support arm 12 at a right angle, and the position of the tip of the exit guide 8 is expressed by link lengths b and d from the position at which the pressure arm 10*a* intersects the first support arm 12. Specifically, the second support arm 13 as the second support includes the first portion extending from the coupling portion coupling to the first support arm 12, the second portion extending from the coupling portion coupling to the exit guide 8, and the bending point at which the first portion and the second portion intersect each other. The parameters a, b, c, d, e, and f are defined as follows:

The parameter a is a distance from the fulcrum 14*a* of the pressure arm 10*a* as the pressure plate that receives the pressing force from the cam 9 as the pressing force adjuster to a position at which the pressure arm 10*a* is coupled to the first support arm 12 as the first support;

The parameter b is a distance from the position at which the pressure arm 10*a* as the pressure plate that receives the pressing force from the cam 9 as the pressing force adjuster is coupled to the first support arm 12 as the first support to the position at which the first support arm 12 is coupled to the exit guide 8;

The parameter c is a distance from the position at which the pressure arm 10*a* as the pressure plate that receives the pressing force from the cam 9 as the pressing force adjuster is coupled to the first support arm 12 as the first support to a position at which the first support arm 12 is coupled to the second support arm 13 as the second support;

The parameter d is the distance from the position at which the first support arm 12 as the first support is coupled to the exit guide 8 to the position of the tip of the exit guide 8;

The parameter e is the distance from the position at which the first support arm 12 as the first support is coupled to the second support arm 13 as the second support to the bending point; and The parameter f is the distance from the bending point to the tip of the entrance guide 7.

FIG. 15 includes coordinates. The origin of the coordinates is the fulcrum 14*a* of the pressure arm 10*a*, and X-axis is parallel to the straight line connecting the center of the fixing roller 1 and the center of the pressure roller 2. An angle between the pressure arm 10*a* and the X-axis is defined as an angle θ.

The position (x,y) of the tip of the entrance guide is represented by the following Expression 15 and Expression 16.

$$x=a\cos\theta+c-f \quad \text{(Expression 15)}$$

$$y=a\sin\theta-e \quad \text{(Expression 16)}$$

The position (x,y) of the tip of the exit guide is represented by the following Expression 17 and Expression 18.

$$x=a\cos\theta-b \quad \text{(Expression 17)}$$

$$y=a\sin\theta-d \quad \text{(Expression 18)}$$

Figure 16:
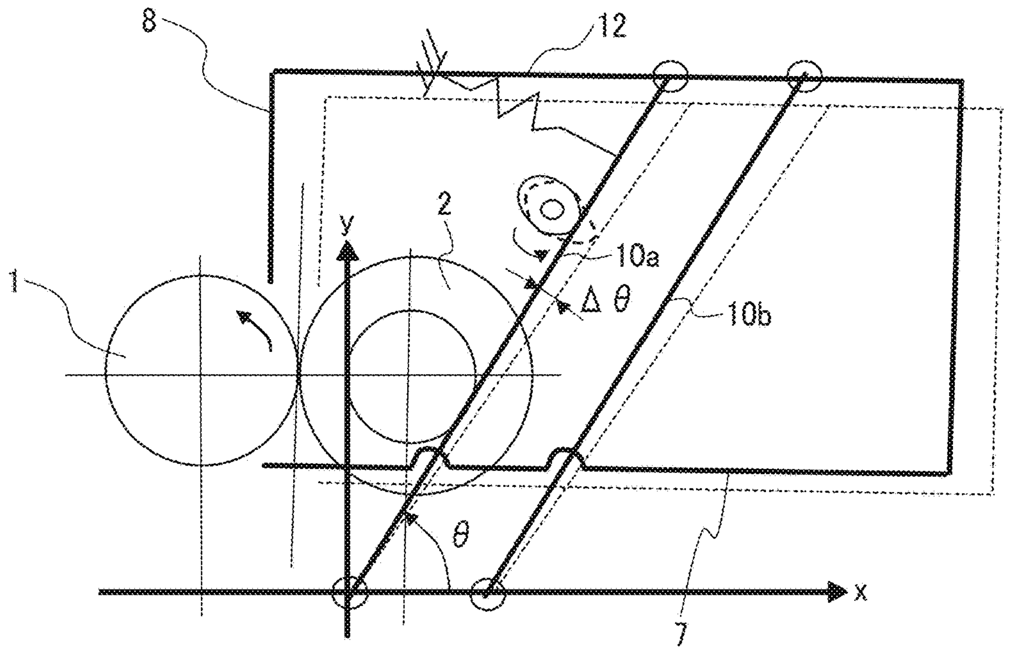
FIG. 16 is a diagram to illustrate change in the position of the tip of the entrance guide and change in the position of the tip of the exit guide that are caused by rotation of the pressure arm rotated by the cam in the fixing device of FIGS. 13 and 14.

FIG. 16 illustrates change in the position of the tip of the entrance guide 7 and change in the position of the tip of the exit guide 8 after the cam 9 rotates to pivot the pressure arm 10 by Δθ in the fixing device of FIG. 15 to change the pressure condition from the pressure condition for the sheet of plain paper to the pressure condition for the envelope (that is, to reduce the pressing force).

FIG. 16 is a diagram to illustrate change in positions of tips of the entrance guide and the exit guide caused by rotation of the pressure arm rotated by the cam in the fixing device of FIGS. 13 and 14.

Table 5 illustrates an example of values of link parameters of the fixing device in FIG. 15.

TABLE 5

| p | q | r0 | r1 | r2 | s | t | θ |
|---|---|---|---|---|---|---|---|
| 52 mm | 50 mm | 15 mm | 13 mm | 17 mm | 25 mm | 7 mm | 60° |
| a | b | c | d | e | f | Δθ | |
| 100 mm | 62 mm | 20 mm | 32 mm | 41 mm | 82 mm | 2.14° | |

Table 6 illustrates appropriate ranges of the entrance guide angle and the exit guide angle.

TABLE 6

| | Appropriate Guide Angle Range | |
|---|---|---|
| | Plain paper | Envelope |
| Entrance guide angle β | 15 to 25° | −20 to 0° |
| Exit guide angle γ | 18 to 24° | −10 to 5° |

Figure 17:
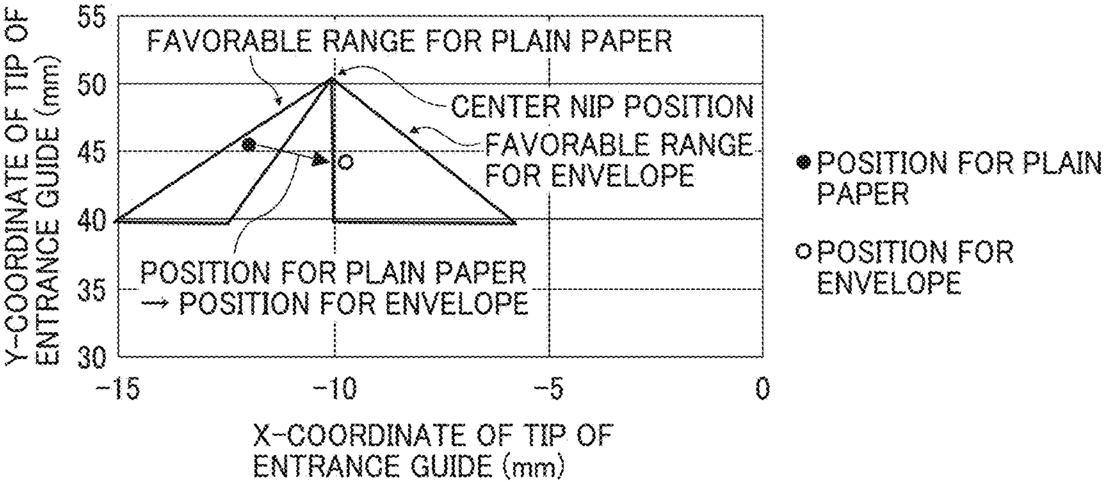
FIG. 17 is a graph to illustrate an example of the change in the position of the tip of the entrance guide in the fixing device of FIGS. 13 and 14.
Figure 18:
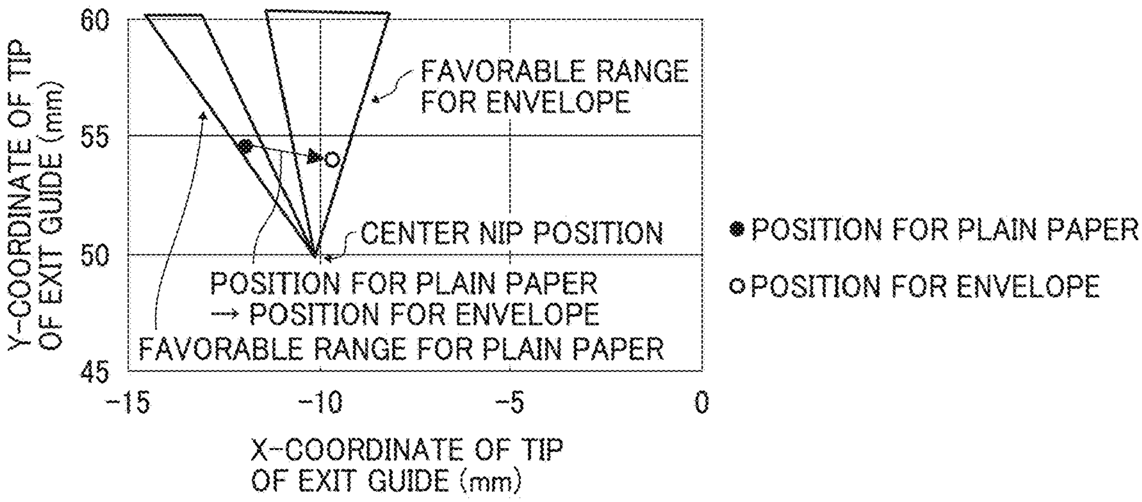
FIG. 18 is a graph to illustrate an example of the change in the position of the tip of the exit guide in the fixing device of FIGS. 13 and 14.

Based on the conditions illustrated in Table 5 and Table 6, FIGS. 17 and 18 illustrate changes in the positions of the tips of the entrance guide 7 and the exit guide 8 when rotating the cam 9 pivots the pressure arm 10 to change the pressure condition from the pressure condition for the sheet of plain paper to the pressure condition for the envelope that reduces the pressure.

FIG. 17 is a graph to illustrate an example of the change in the position of the tip of the entrance guide. FIG. 18 is a graph to illustrate an example of the change in the position of the tip of the exit guide. FIGS. 17 and 18 illustrate movements from proper positions of the tips of the entrance guide 7 and the exit guide 8 for the sheet of plain paper to proper positions of the tips of the entrance guide 7 and the exit guide 8 for the envelope. The movements are caused by rotating the cam 9 to pivot the pressure arm 10 to reduce the pressing force in the fixing device having the link parameters illustrated in Table 5.

The following Expressions 19 to 22 calculate the displacement amounts Δx in the x direction and the displacement amounts Δy in the y direction when the pressure arm angle θ formed by the pressure arm 10*a* and the straight line connecting the center of the fixing roller 1 and the center of the pressure roller 2 is changed by Δθ. The x direction is orthogonal to the sheet conveyance direction, and the y direction is the sheet conveyance direction.

The displacement amounts in the position of the tip of the entrance guide $$x=-a \sin \theta \cdot \Delta\theta \quad \text{(Expression 19)}$$

$$\Delta y=a \cos \theta \cdot \Delta\theta \quad \text{(Expression 20)}$$

The displacement amounts in the position of the tips of the exit guide $$x=-a \sin \theta \cdot \Delta\theta \quad \text{(Expression 21)}$$

$$\Delta y=a \cos \theta \cdot \Delta\theta \quad \text{(Expression 22)}$$

Based on the link parameters in table 5, the position change ratio of the tip of the entrance guide 7 or the exit guide 8 is calculated as (Δx/Δθ, Δy/Δθ) where (Δx, Δy) is the displacement amount of the tip of the entrance guide 7 or the exit guide 8, and Δθ is an amount of change in the pressure arm angle.

Figure 19:
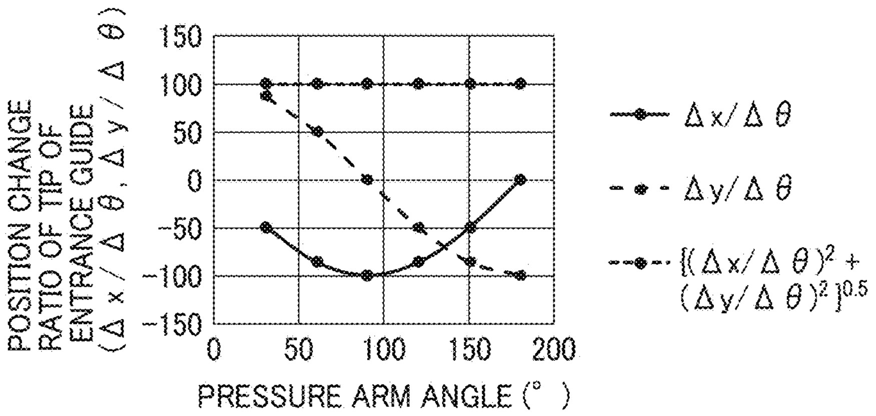
FIG. 19 is a graph illustrating relationships between the pressure arm angle θ and the position change ratios (Δx/Δθ and Δy/Δθ) of the tip of the entrance guide in the fixing device of FIGS. 13 and 14.
Figure 20:
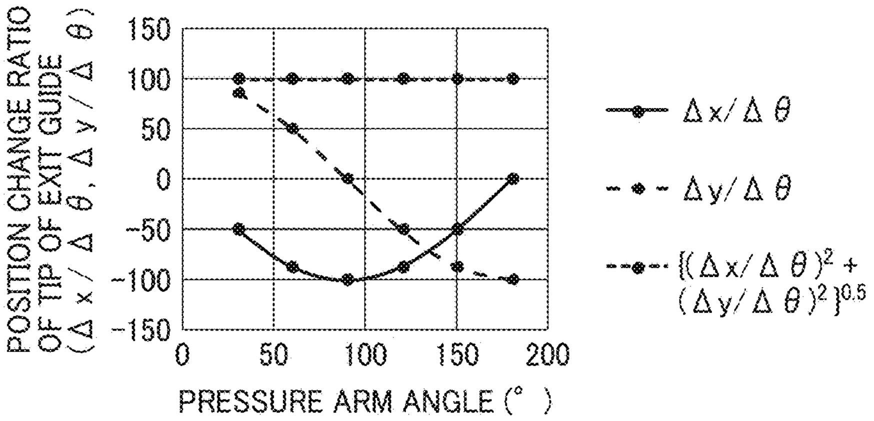
FIG. 20 is a graph to illustrate a relationship between the pressure arm angle θ and the position change ratios (Δx/Δθ and Δy/Δθ) of the tip of the exit guide in the fixing device of FIGS. 13 and 14.

FIG. 19 is a graph to illustrate a relationship between the pressure arm angle and the position change ratio of the tip of the entrance guide in the fixing device having the link parameters of Table 5. FIG. 20 is a graph to illustrate a relationship between the pressure arm angle and the position change ratio of the tip of the exit guide in the fixing device having the link parameters of Table 5. In FIGS. 19 to 22, $\{(\Delta x/\Delta\theta)^2+(\Delta y/\Delta\theta)^2\}^{0.5}$ is reference data that compares the order of value of (Δx/Δθ) with the order of value of (Δy/Δθ).

When the expressions 19 to 22 are expressed as Δx=Jx(θ)·Δθ and Δy=Jy(θ)·Δθ, FIGS. 19 and 20 illustrate Jx(θ) and Jy(θ).

When the pressure arm 10 reduces the pressing force, the amount of change in the pressure arm angle Δθ is smaller than zero in FIG. 15, and Δx=Jx(θ)·Δθ needs to be larger than zero to move the tip of the entrance guide and the tip of the exit guide from the positions for the sheet of plain paper to the positions for the envelope.

Regarding Δy=Jy(θ)·Δθ, since it is desirable that the entrance guide and the exit guide is not too close to the nip during movement, Δy≤0 for the entrance guide 7 and Δy≥0 for the exit guide 8 are the best condition.

Then, Jx(θ) and Jy(θ) are as follows.

Regarding the entrance guide, since Δx needs to be zero or more and Δθ is zero or less (Δx≥0, Δθ≤0), Jx(θ)=Δx/Δθ is zero or less.

In addition, regarding the entrance guide, Jy(θ)=Δy/Δθ≥0 is the best condition because Δy≤0 is the best condition and Δθ is zero or less as described above (Δy≤0, Δθ≤0).

Regarding the exit guide, since Δx needs to be zero or more and Δθ is zero ore less (Δx≥0, Δθ≤0), Jx(θ)=Δx/Δθ is zero or less.

In addition, regarding the exit guide, Jy(θ)=Δy/Δθ≤0 is the best condition because Δy≥0 is the best condition and Δθ is zero or less as described above (Δy≥0, Δθ≤0).

Figure 21:
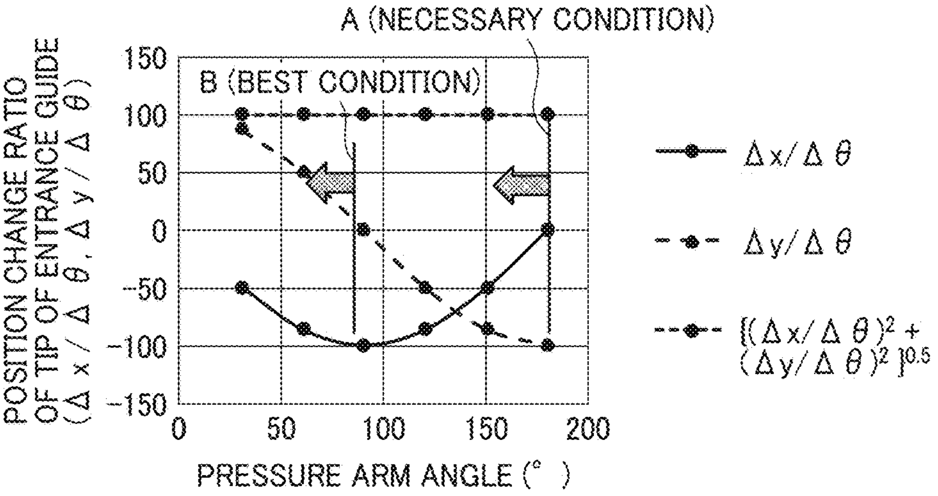
FIG. 21 is a graph illustrating relationships between the pressure arm angle θ and the position change ratios (Δx/Δθ and Δy/Δθ) of the tip of the entrance guide in the fixing device of FIGS. 13 and 14 to illustrate appropriate conditions for the pressure arm angle θ.
Figure 22:
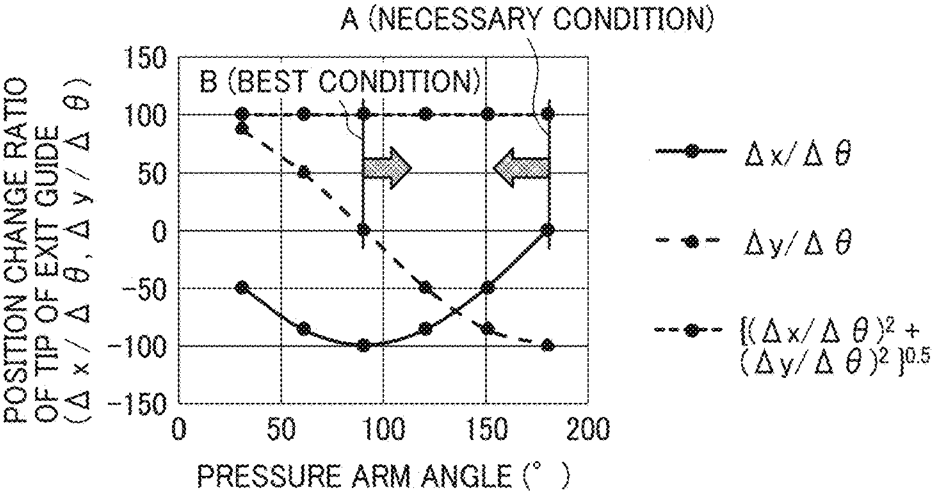
FIG. 22 is a graph illustrating relationships between the pressure arm angle θ and the position change ratios (Δx/Δθ and Δy/Δθ) of the tip of the exit guide in the fixing device of FIGS. 13 and 14 to illustrate appropriate conditions for the pressure arm angle θ.

The above-described conditions are illustrated in FIG. 21 and FIG. 22.

FIG. 21 is a graph illustrating relationships between the pressure arm angle θ and the position change ratios (Δx/Δθ and Δy/Δθ) of the tip of the entrance guide in the fixing device of FIGS. 13 and 14 to illustrate appropriate conditions for the pressure arm angle θ regarding the entrance guide. FIG. 22 is a graph illustrating relationships between the pressure arm angle θ and the position change ratios (Δx/Δθ and Δy/Δθ) of the tip of the exit guide in the fixing device of FIGS. 13 and 14 to illustrate appropriate conditions for the pressure arm angle θ regarding the exit guide.

FIGS. 21 and 22 each include the line A and the line B. The line A in each of FIGS. 21 and 22 means a necessary condition in which the tip of the entrance guide 7 and the tip of the exit guide 8 moves from left to right in FIG. 15 when the pressure arm reduces the pressing force. The pressure arm angle must be a value indicated by the line A in each of FIGS. 21 and 22 or less. In addition, the line B in FIG. 21 illustrates the best condition of the pressure guide angle for the entrance guide, and the line B in FIG. 22 illustrates the best condition of the pressure guide angle for the exit guide. In the best condition, the tip of the entrance guide and the tip of the exit guide is not too close to the nip, and a movement amount of each tip in the sheet conveyance direction is small while the pressure arm moves the entrance guide and the exit guide and reduces the pressing force. As illustrated in FIG. 21, the best condition of the pressure guide angle for the entrance guide is the value indicated by the line B or less. As illustrate in FIG. 22, the best condition of the pressure guide angle for the exit guide is the value indicated by the line B or more.

The pressure arm has one pressure arm angle θ regarding the entrance guide 7 and the exit guide 8. FIGS. 21 and 22 illustrate the necessary condition of the pressure arm guide angle θ that is 180° or less. The range of the pressure guide angle β that is 180° or less is a range that is a left side from the line Ain FIGS. 21 and 22. The range satisfies Δx≥0.

In addition to the necessary condition, the pressure guide angle θ=90° (=π/2) satisfies the best condition indicated by the line B in each of FIGS. 21 and 22 (that is, the entrance guide condition and the exit guide condition regarding Δy). As a result, Expression 19 to Expression 22 give the best condition of the pressure guide angle θ=90°.

Figure 23:
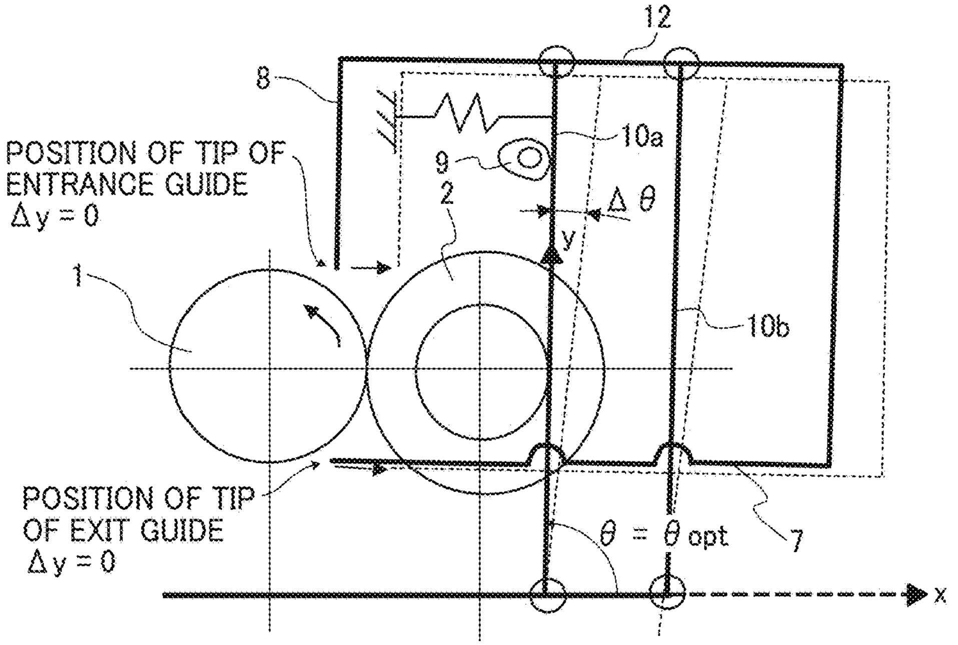
FIG. 23 is a schematic diagram to illustrate the position of the tip of the entrance guide and the position of the tip of the exit guide in the best condition of the pressure arm angle θopt in the fixing device of FIGS. 13 and 14.

FIG. 23 illustrates the configuration of the fixing device having the best pressure arm angle 90°. FIG. 23 is a schematic diagram to illustrate the positions of the tips of the entrance guide and the exit guide in the best condition of the pressure arm angle θopt=90° of the fixing device of FIGS. 13 and 14.

The pressing force adjuster may be configured by the cam 9 driven by an electric driver or a manual operation lever operated by a user to reduce the pressing force when the image forming apparatus prints the toner image on the envelope.

As described above, in the fixing device of the present embodiment, the position of the tip of the entrance guide 7 and the position of the tip of the exit guide 8 change along the straight line connecting the center of the fixing roller 1 and the center of the pressure roller 2 when the angle θ of the pressure arm 10 with respect to the straight line changes between the angle to increase the pressing force and the angle to decrease the pressing force.

In the above-described configuration, the direction of the displacement of the entrance guide 7 and the direction of the displacement of the exit guide 8 are along the straight line connecting the center of the fixing roller 1 and the center of the pressure roller 2 when the cam 9 changes the position of the pressure arm 10 between the position to increase the pressing force and the position to decrease the pressing force. The above-described configuration can prevent the occurrence of the crease in both the envelope and the sheet of plain paper printed on both sides.

The tip of the entrance guide 7 and the tip of the exit guide 8 do not approach the nip in a direction defined by the straight line connecting the entrance of the nip and the exit of the nip when the angle θ of the pressure arm 10 with respect to the straight line connecting the center of the fixing roller 1 and the center of pressure roller 2 is changed between the angle to increase the pressing force and the angle to decrease the pressing force.

In the above-described configuration, the cam 9 changes the position of the pressure arm 10 between the position to increase the pressing force and the position to decrease the pressing force and moves the entrance guide 7 and the exit guide 8. In the direction of the displacement of the entrance guide 7 and the direction of the displacement of the exit guide 8, the entrance guide 7 and the exit guide 8 do not approach the nip. In other words, the entrance guide 7 and the exit guide 8 do not approach the nip in the direction of the straight line connecting the entrance of the nip and the exit of the nip that is orthogonal to the straight line connecting the center of the fixing roller 1 and the center of the pressure roller 2. Thus, the entrance guide 7 and the exit guide 8 can displace without damaging the fixing roller 1 and the pressure roller 2. The above-described configuration can prevent the occurrence of the crease in both the envelope and the sheet of plain paper printed on both sides.

In the fixing device of the present embodiment, it is preferable that the pressure arm angle θ with respect to the straight line connecting the center of the fixing roller 1 and the center of the pressure roller 2 is in the range from 90° to 180°.

The above describes an angle range of the pressure arm angle θ with respect to the straight line connecting the center of the fixing roller 1 and the center of the pressure roller 2 that can prevent the occurrence of the crease in both the envelope and the sheet of plain paper printed on both sides.

In the above-described fixing device including the parallel link mechanism according to the second embodiment of the present disclosure, the pressure arm can efficiently apply the pressing force to the fixing roller and realize good fixing quality without the occurrence of the crease regardless of the paper type.

Next, embodiments of the pressing force adjuster are described with reference to FIGS. 24 to 26.

Figure 24:
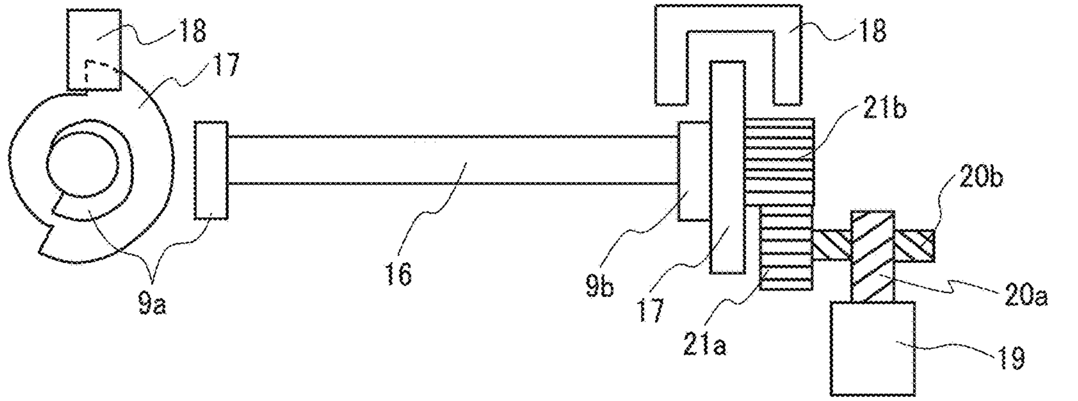
FIG. 24 is a diagram illustrating an example of a configuration of a pressing force adjuster driven by a motor.

FIG. 24 is a diagram illustrating an example of the pressing force adjuster driven by a motor. The pressing force adjuster of FIG. 24 includes a cam shaft 16, a pair of cams **9*a* and 9*b* disposed at both ends of the cam shaft 16 in the axial direction of the cam shaft 16, a motor 19, and a driving system configured by worm gears 20*a* and 20*b* and spur gears 21*a* and 21*b*. The motor 19 drives and rotates the pair of cams 9*a* and 9*b* via the driving system. The pressing force adjuster also includes an optical sensor 18 and a rotational position detector 17. The rotational position detector 17 is coaxially disposed with the pair of cams 9*a* and 9*b* and has a step portion as illustrated in FIG. 24. The optical sensor 18 can detect the step portion, which enables controlling a position of the pair of cams 9*a* and 9*b* in a rotation direction of the pair of cams 9*a* and 9*b*** to be a desired position.

Figure 25:
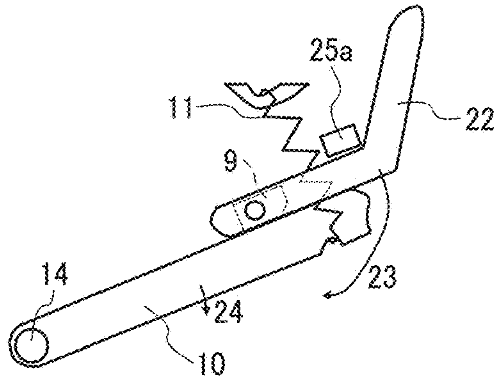
FIG. 25 is a diagram illustrating an example of a configuration of the pressing force adjuster including a manual operation lever rotated to increase the pressing force.
Figure 26:
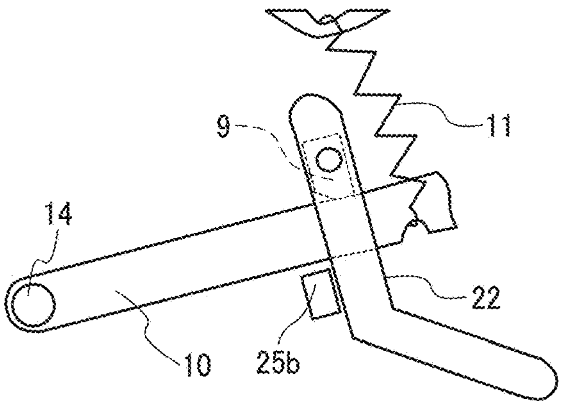
FIG. 26 is a diagram illustrating the example of the configuration of the pressing force adjuster including the manual operation lever rotated to decrease the pressing force.

As illustrated in FIG. 25, the pressing force adjuster may include the manual operation lever. The user rotates the manual operation lever by a predetermined angle to reduce the pressing force when the image forming apparatus prints the toner image on the envelope. FIG. 25 is a diagram illustrating an example of a configuration including the manual operation lever rotated to increase the pressing force. FIG. 26 is a diagram illustrating the example of the configuration including the manual operation lever rotated to decrease the pressing force. FIG. 25 illustrates a condition to increase the pressing force, and FIG. 26 illustrates a condition to decrease the pressing force.

The manual operation lever 22 is coaxially coupled to the cam 9 and is manually rotatable about the center of the cam 9. Rotating the manual operation lever 22 about the shaft of the cam 9 in the direction indicated by an arrow 23 in FIG. 25 rotates the pressure arm 10 in the direction indicated by an arrow 24 and sets the cam 9 at the position to reduce the pressing force as illustrated in FIG. 26.

The pressing force adjuster may include stoppers **25*a* and 25*b*. The stoppers 25*a* and stop the manual operation lever 22** at the position to increase the pressing force and the position to reduce the pressing force, respectively.

In each of the above-described embodiments, the cam 9 may be manually driven or driven by an electric driver.

The above-described simple configuration including the cam can prevent the occurrence of the crease in both the envelope and the sheet of plain paper printed on both sides.

Next, a description is given of a basic configuration of the image forming apparatus.

Figure 27:
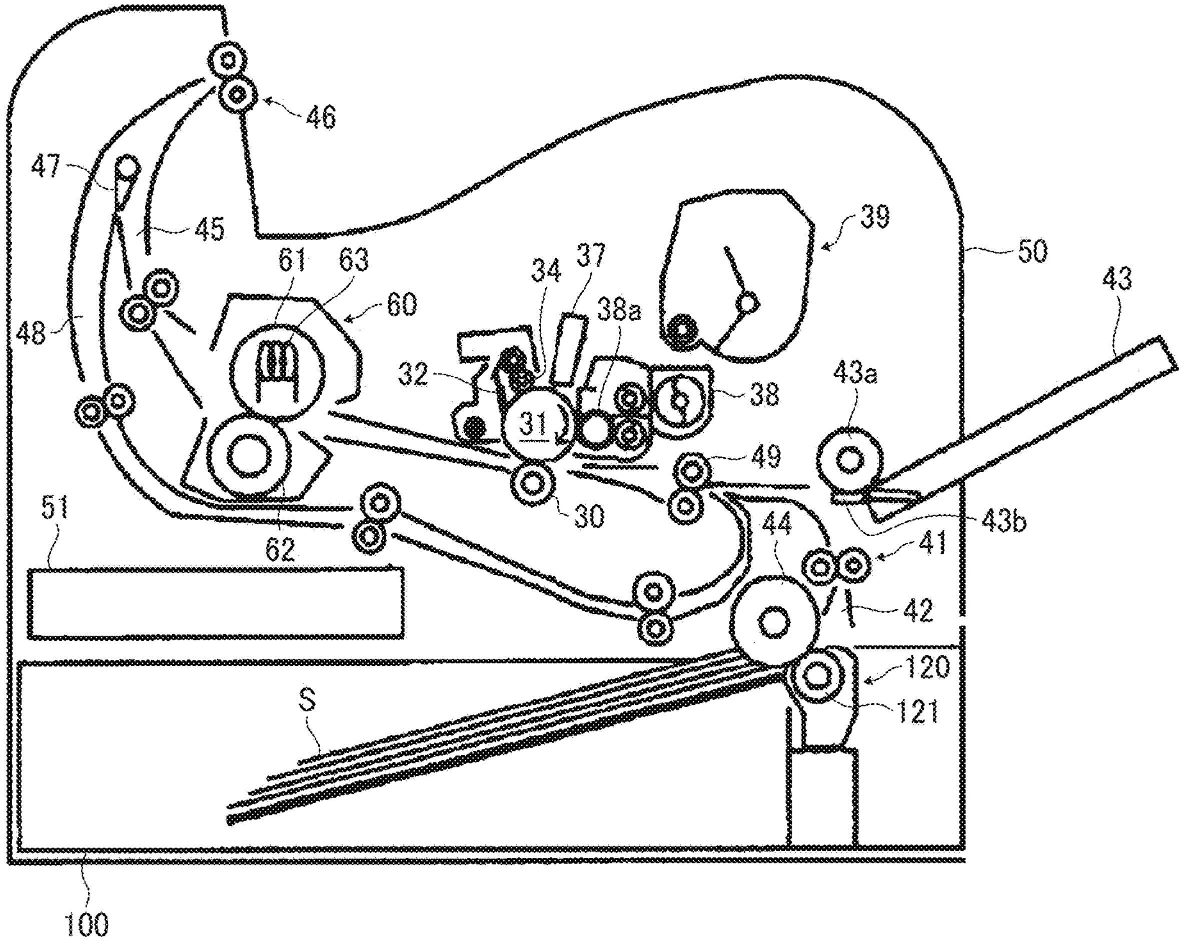
FIG. 27 is a schematic cross-sectional view of an image forming apparatus according to an embodiment of the present disclosure.

FIG. 27 is a schematic cross-sectional view of the image forming apparatus according to the present embodiment of the present disclosure.

In FIG. 27, the image forming apparatus includes a housing 50, a photoconductor 31, and a sheet tray 100. The photoconductor 31 functions as an image bearer or a latent image bearer. The sheet tray 100 is detachably attachable to the housing 50. The sheet tray 100 contains a bundle of sheets S as recording media.

The image forming apparatus further includes a feed roller 44. As the feed roller 44 rotates, the sheet S is sent out from the sheet tray 100. After passing through a sheet separation nip described below, the sheet P enters a sheet feeding path 42. In the sheet feeding path 42, a first conveyance roller pair 41 nips the sheet P therein and conveys the sheet P in a sheet conveyance direction. A registration roller pair 49 is disposed at an end of the sheet feeding path 42. When the sheet S reaches the registration roller pair 49, the sheet S is temporarily stopped in a state in which the leading end of the sheet S is in contact with a registration nip of the registration roller pair 49. Abutting the leading end of the sheet S on the registration nip corrects skew of the sheet S.

The registration roller pair 49 starts rotating to feed the sheet S to a transfer nip timely so that a toner image on the photoconductor 31 is transferred onto the sheet S in the transfer nip. At this time, the first conveyance roller pair 41 starts rotating at the same time as the start of rotation of the registration roller pair 49 to resume the conveyance of the sheet S that is temporarily stopped.

The housing 50 of the image forming apparatus holds a bypass sheet feeder including a bypass tray 43, a bypass feed roller 43*a*, and a separation pad 43*b*. As the bypass feed roller 43*a* rotates, the sheet manually set on the bypass tray 43 is fed from the bypass tray 43. The separation pad 43*b* is disposed in contact with the bypass feed roller 43*a*, forming a separation nip. After passing through the separation nip between the bypass feed roller 43*a* and the separation pad 43*b*, the sheet enters a region upstream from the registration roller pair 49 in the sheet feeding path 42 in the sheet conveyance direction. The sheet passes the registration roller pair 49 and reaches the transfer nip similar to the sheet fed form the sheet tray 100.

The photoconductor 31 is a drum-shaped photoconductor that rotates in a clockwise direction in FIG. 27. Around the photoconductor 31, the image forming apparatus includes a charging roller 34, a latent image writing device 37, a developing device 38, the transfer roller and a cleaning blade 32. The charging roller 34 rotates while contacting the photoconductor 31, thereby forming a charging nip. A power supply applies a charging bias to the charging roller 34. Thus, in the charging nip, an electrical discharge is induced between the surface of the photoconductor 31 and the surface of the charging roller 34. As a result, the surface of the photoconductor 31 is uniformly charged.

The latent image writing device 37 includes a light emitting diode (LED) array and performs light scanning with LED light over the surface of the photoconductor 31 that has been uniformly charged. On the uniformly charged surface of the photoconductor 31, the area having been subjected to the light irradiation through this light scanning attenuates the electric potential therein. Thus, an electrostatic latent image is formed on the surface of the photoconductor 31.

As the photoconductor 31 rotates, the electrostatic latent image passes through a developing range between the surface of the photoconductor 31 and the developing device 38. In the developing range, the developing device 38 supplies toner to the electrostatic latent image formed on the photoconductor 31, visualizing the electrostatic latent image as a toner image.

A toner cartridge 39 is disposed above the developing device 38. The toner cartridge 39 contains fresh toner to be supplied. The fresh toner is supplied to the developing device 38 according to a toner supply operation signal output from a controller 51.

As the photoconductor 31 rotates, the toner image formed on the surface of the photoconductor 31 as a result of the development by the developing device 38 enters the transfer nip where the photoconductor 31 and the transfer roller 30 as a transferor contact each other. An electric bias having the opposite polarity to the latent image electric potential of the photoconductor 31 is applied to the transfer roller 30 to form a transfer electric field in the transfer nip.

As described above, the registration roller pair 49 conveys the sheet S toward the transfer nip in synchrony with a timing at which the toner image formed on the photoconductor 31 is overlaid onto the sheet S in the transfer nip. Due to the transfer electric field and a transfer nip pressure, as the sheet S is brought to closely contact with the toner image formed on the photoconductor 31 at the transfer nip, the toner image is transferred onto the sheet S.

Residual toner that is not transferred onto the sheet S remains on the surface of the photoconductor 31 after having passed through the transfer nip. The cleaning blade 32 is in contact with the photoconductor 31 to scrape off the residual toner from the surface of the photoconductor 31 and clean the surface of the photoconductor 31.

The surface of the photoconductor 31 that is cleaned by the cleaning blade 32 is electrically discharged by an electric discharging device. Thereafter, the surface of the photoconductor 31 is uniformly charged again by the charging roller 34.

After the sheet S passes through the transfer nip formed by the photoconductor 31 and the transfer roller 30 contacting each other, the sheet S is conveyed to a fixing device 60. The fixing device 60 includes a fixing roller 61, a heat source 63 (a heater) such as a halogen lamp, and a pressure roller 62. The fixing roller 61 serves as a heating rotator. The heat source 63 is inside the fixing roller 61. The pressure roller 62 serves as a nip formation rotator and is pressed against the fixing roller 61. The fixing roller 61 and the pressure roller 62 contact each other to form the fixing nip.

The fixing roller 61 includes a hollow core made of metal such as stainless steel or aluminum and a release acceleration layer covering an outer peripheral surface of the core to improve releasability of toner and paper powder from the surface of the fixing roller 61. The pressure roller 62 includes a core made of metal such as stainless steel or aluminum and an elastic layer on an outer surface of the core. The elastic layer is made of material having elasticity and heat resistance such as fluoro-rubber or silicone rubber.

The toner image is fixed to the surface of the sheet S that is held in the fixing nip due to application of heat and pressure. Thereafter, the sheet S that has passed through the fixing device 60 passes through a sheet ejection path 45. Then, the sheet S is held in a sheet ejection nip formed by a pair of sheet ejection rollers 46.

The image forming apparatus switches printing modes between a single-side printing mode for performing single-side printing and a duplex printing mode for performing duplex printing. In the single-side printing mode, the image forming apparatus produces an image on one side of the sheet S. By contrast, the image forming apparatus prints respective images on both sides of the sheet S in the duplex printing mode. In the single-side printing mode or in the duplex printing mode after images are formed on both sides of the sheet S, the pair of sheet ejection rollers 46 continues rotating in a forward direction. As a result, the sheet S in the sheet ejection path 45 is ejected out of the image forming apparatus. The ejected sheet S is stacked on a sheet stacker provided on the top face of the housing 50 of the image forming apparatus.

By contrast, in the duplex printing mode when an image is formed on one side of the sheet S, the pair of sheet ejection rollers 46 is rotated in the reverse direction at the timing at which the end of the sheet S enters the sheet ejection nip of the pair of sheet ejection rollers 46. At this time, a switching claw 47 disposed near the downstream end of the sheet ejection path 45 moves to block (close) the sheet ejection path 45 and open an entrance of a reverse conveyance path 48 at the same time. As the sheet S starts reversing by the reverse rotation of the pair of sheet ejection rollers 46, the sheet S is conveyed to the reverse conveyance path 48. In the reverse conveyance path 48, the sheet S is conveyed while being vertically reversed and then conveyed to the registration nip of the registration roller pair 49 again. Then, after the toner image has been formed on the other side of the sheet S in the transfer nip, the sheet S passes through the fixing device 60, the sheet ejection path 45, and the pair of sheet ejection rollers 46 and is then ejected to the outside of the housing 50 of the image forming apparatus.

When the fixing device 60 fixes the toner image onto the sheet S, the sheet S is subjected to high temperature. Under the high temperature, moisture in the sheet evaporates. Evaporation of the moisture can cause a so-called end curl in which an end of sheet in a width direction of the sheet curls depending on the grain of sheet. In particular, the end curl is likely to occur in the case that the sheet is a large sheet of plain paper.

Note that the present disclosure is not limited to the above-described embodiments. Within the scope of the present disclosure, those skilled in the art may change, add, or convert each element of the above-described embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A fixing device comprising:

a fixing rotator;

a pressure rotator configured to press the fixing rotator to form a nip between the fixing rotator and the pressure rotator;

a pressure plate configured to rotate about a fulcrum to press the pressure rotator;

a pressing force adjuster configured to adjust a pressing force of the pressure rotator;

an entrance guide configured to guide a recording medium entering the nip;

an exit guide configured to guide the recording medium ejected from the nip; and a transmission configured to transmit a displacement of the pressure plate to the entrance guide and the exit guide.

2. The fixing device according to claim 1, wherein the pressing force adjuster is configured to rotate the pressure plate about the fulcrum to adjust the pressing force and set the pressure plate to any of a plurality of positions in a rotation direction of the pressure plate, and wherein the plurality of positions includes a maximum pressure position at which the pressure rotator pressed by the pressure plate presses a sheet of plain paper with a maximum pressing force and an envelope position at which the pressure rotator pressed by the pressure plate presses an envelope with a pressing force smaller than the maximum pressing force.

3. The fixing device according to claim 2, wherein when the transmission transmits a displacement of the pressure plate pressing the pressure rotator with the maximum pressing force to the entrance guide and the exit guide, the transmission sets an entrance guide angle between a reference line connecting an entrance of the nip and an exit of the nip and a first straight line connecting a center of the nip and a tip of the entrance guide to be in a range from +15° to +25° and an exit guide angle between the reference line and a second straight line connecting the center of the nip and a tip of the exit guide to be in a range from +18° to +24°, and wherein when the transmission transmits a displacement of the pressure plate pressing the pressure rotator with the pressing force to press the envelope to the entrance guide and the exit guide, the transmission sets the entrance guide angle between the reference line and the first straight line to be in a range from −20° to 0° and the exit guide angle between the reference line and the second straight line to be in a range from −10° to +5°, where a positive angle of each of the entrance guide angle and the exit guide angle is formed by the reference line and one of the first straight line and the second straight line that are inclined toward one rotator of the fixing rotator and the pressure rotator, the one rotator having a convex shape in the nip, and a negative angle of each of the entrance guide angle and the exit guide angle is formed by the reference line and one of the first straight line and the second straight line that are inclined toward the other rotator of the fixing rotator and the pressure rotator, the other rotator having a concave shape in the nip.

4. The fixing device according to claim 2, wherein the transmission is configured to move a tip of the entrance guide and a tip of the exit guide along a direction of a straight line connecting a center of the fixing rotator and a center of the pressure rotator while the pressing force adjuster moves the pressure plate between the maximum pressure position and the envelope position.

5. The fixing device according to claim 2, wherein the transmission is configured to move the entrance guide and the exit guide in a direction in which the entrance guide and the exit guide do not approach the nip in a direction of a straight line connecting a center of the fixing rotator and a center of the pressure rotator while the pressing force adjuster moves the pressure plate between the maximum pressure position and the envelope position.

6. The fixing device according to claim 1, wherein the pressing force adjuster includes a cam being in contact with the pressure plate and configured to be driven by one of a motor and a manual operation lever to set the pressure plate at one of a maximum pressure position at which the pressure rotator pressed by the pressure plate presses a sheet of plain paper with a maximum pressing force and an envelope position at which the pressure rotator pressed by the pressure plate presses an envelope with a pressing force smaller than the maximum pressing force.

7. The fixing device according to claim 1,
wherein the transmission includes a support coupled to the pressure plate, the entrance guide, and the exit guide.

8. The fixing device according to claim 1,
wherein the transmission is orthogonally coupled to the pressure plate.

9. The fixing device according to claim 1,
wherein the transmission includes a support coupled to two rotatable pressure plates including the pressure plate, the entrance guide, and the exit guide.

10. The fixing device according to claim 1,
wherein the transmission includes:
a first support coupled to the exit guide and two pressure plates including the pressure plate; and
a second support coupled to the first support and the entrance guide, and
wherein the first support and the two pressure plates configure a parallel link mechanism in which a straight line connecting two fulcrums of the two pressure plates, a straight line connecting a center of the fixing rotator and a center of the pressure rotator, and the first support are parallel to one another.

11. The fixing device according to claim 1,
wherein an angle between the pressure plate and a straight line connecting a center of the fixing rotator and a center of the pressure rotator is in a range from 46° to 137°.

12. The fixing device according to claim 1,
wherein the transmission includes:
a first support coupled to the pressure plate and the entrance guide; and
a second support coupled to the first support and the exit guide, the second support including a first portion extending from a coupling portion coupling to the first support, a second portion extending from a coupling portion coupling to the exit guide, and a bending point at which the first portion and the second portion intersect each other, and
wherein an angle θ between the pressure plate and a straight line connecting a center of the fixing rotator and a center of the pressure rotator is in a following range, $$\tan^{-1}[(a-d)/b] \leq \theta \leq \tan^{-1}[(a-e)/(f-c)].$$

where parameters a, b, c, d, e, and f are defined as follows:
a is a distance from the fulcrum of the pressure plate that receives the pressing force from the pressing force adjuster to a position at which the pressure plate that receives the pressing force from the pressing force adjuster is coupled to the first support;
b is a distance from the position at which the pressure plate that receives the pressing force from the pressing force adjuster is coupled to the first support to a position at which the first support is coupled to the exit guide;
c is a distance from the position at which the pressure plate that receives the pressing force from the pressing force adjuster is coupled to the first support to a position at which the first support is coupled to the second support;
d is a distance from the position at which the first support is coupled to the exit guide to a position of a tip of the exit guide;
e is a distance from the position at which the first support is coupled to the second support to the bending point; and
f is a distance from the bending point to a tip of the entrance guide.

13. The fixing device according to claim 1,
wherein an angle between the pressure plate and a straight line connecting a center of the fixing rotator and a center of the pressure rotator is in a range from 90° to 180°.

14. An image forming apparatus comprising the fixing device according to claim 1.

* * * * *